(12) United States Patent
Ato

(10) Patent No.: US 12,057,050 B2
(45) Date of Patent: Aug. 6, 2024

(54) DISPLAY APPARATUS, DISPLAY CONTROL METHOD, AND RECORDING MEDIUM

(71) Applicant: SONY CORPORATION, Tokyo (JP)

(72) Inventor: Masayuki Ato, Tokyo (JP)

(73) Assignee: SONY CORPORATION, Tokyo (JP)

( * ) Notice: Subject to any disclaimer, the term of this patent is extended or adjusted under 35 U.S.C. 154(b) by 715 days.

(21) Appl. No.: 17/250,780

(22) PCT Filed: Aug. 26, 2019

(86) PCT No.: PCT/JP2019/033288
§ 371 (c)(1),
(2) Date: Mar. 3, 2021

(87) PCT Pub. No.: WO2020/054378
PCT Pub. Date: Mar. 19, 2020

(65) Prior Publication Data
US 2021/0311312 A1 Oct. 7, 2021

(30) Foreign Application Priority Data

Sep. 12, 2018 (JP) .................................. 2018-170684

(51) Int. Cl.
*G09G 3/00* (2006.01)
*G09G 3/20* (2006.01)
(Continued)

(52) U.S. Cl.
CPC ............. *G09G 3/2081* (2013.01); *G09G 3/22* (2013.01); *G09G 3/32* (2013.01); *G09G 3/34* (2013.01);
(Continued)

(58) Field of Classification Search
None
See application file for complete search history.

(56) References Cited

U.S. PATENT DOCUMENTS 9,310,559 B2 * 4/2016 Macnamara ........... G02B 30/50
2007/0070504 A1 * 3/2007 Akutsu .................... G02B 5/32
359/566

(Continued)

FOREIGN PATENT DOCUMENTS

EP 3508906 A1 7/2019
JP 2007-94175 A 4/2007
(Continued)

OTHER PUBLICATIONS

International Search Report and Written Opinion of PCT Application No. PCT/JP2019/033288, issued on Nov. 12, 2019, 09 pages of ISRWO.

*Primary Examiner* — Martin Mushambo
(74) *Attorney, Agent, or Firm* — CHIP LAW GROUP

(57) ABSTRACT

A display apparatus includes an optical see-through display apparatus, and includes a light source that emits lights a combiner including a diffraction member that diffracts light incident from the light source and outputs the light, and a controller that controls light emission of the light source. The controller controls a light output of the light source on the basis of a wavelength of light outputted from the light source and diffraction efficiency of the combiner that is changed resulting from change in a wavelength of incident light.

17 Claims, 23 Drawing Sheets

(51) Int. Cl.
  *G09G 3/22*  (2006.01)
  *G09G 3/32*  (2016.01)
  *G09G 3/34*  (2006.01)
  *G02B 27/01*  (2006.01)

(52) U.S. Cl.
  CPC .... *G02B 2027/013* (2013.01); *G02B 27/0172* (2013.01); *G09G 2320/0633* (2013.01); *G09G 2320/064* (2013.01); *G09G 2360/141* (2013.01); *G09G 2360/144* (2013.01); *G09G 2360/145* (2013.01)

(56) References Cited

U.S. PATENT DOCUMENTS

| | | | | |
|---|---|---|---|---|
| 2010/0207964 | A1* | 8/2010 | Kimmel | G02F 1/133615 313/111 |
| 2013/0222384 | A1* | 8/2013 | Futterer | H04N 13/344 345/426 |
| 2014/0064655 | A1* | 3/2014 | Nguyen | G02B 6/0076 385/11 |
| 2014/0140653 | A1* | 5/2014 | Brown | G02B 6/0033 385/10 |
| 2014/0140654 | A1* | 5/2014 | Brown | G02F 1/29 385/10 |
| 2014/0233879 | A1* | 8/2014 | Gibson | G02F 1/011 385/4 |
| 2015/0062500 | A1* | 3/2015 | Park | G02F 1/133536 359/485.05 |
| 2015/0178939 | A1* | 6/2015 | Bradski | H04N 13/00 345/633 |
| 2015/0205126 | A1* | 7/2015 | Schowengerdt | G06T 19/20 345/633 |
| 2015/0346490 | A1* | 12/2015 | Tekolste | G02B 30/24 359/566 |
| 2016/0026253 | A1* | 1/2016 | Bradski | H04N 13/128 345/8 |
| 2016/0033771 | A1* | 2/2016 | Tremblay | G02B 26/10 359/851 |
| 2016/0041390 | A1* | 2/2016 | Poon | G02B 5/3083 359/489.08 |
| 2016/0077338 | A1* | 3/2016 | Robbins | G02B 27/4205 359/489.08 |
| 2016/0097930 | A1* | 4/2016 | Robbins | G02B 27/0172 359/619 |
| 2016/0116739 | A1* | 4/2016 | TeKolste | G02B 6/0025 |
| 2016/0116979 | A1* | 4/2016 | Border | G06F 3/013 345/156 |
| 2016/0209648 | A1* | 7/2016 | Haddick | G04G 21/025 |
| 2016/0270656 | A1* | 9/2016 | Samec | G02B 27/0093 |
| 2017/0010488 | A1* | 1/2017 | Klug | G02F 1/1326 |
| 2018/0113310 | A1* | 4/2018 | Rolland | G02B 6/0016 |

FOREIGN PATENT DOCUMENTS

| | | |
|---|---|---|
| JP | 2011-90076 A | 5/2011 |
| JP | 2017-135605 A | 8/2017 |
| WO | 2018/043254 A1 | 3/2018 |

\* cited by examiner

FIG. 5
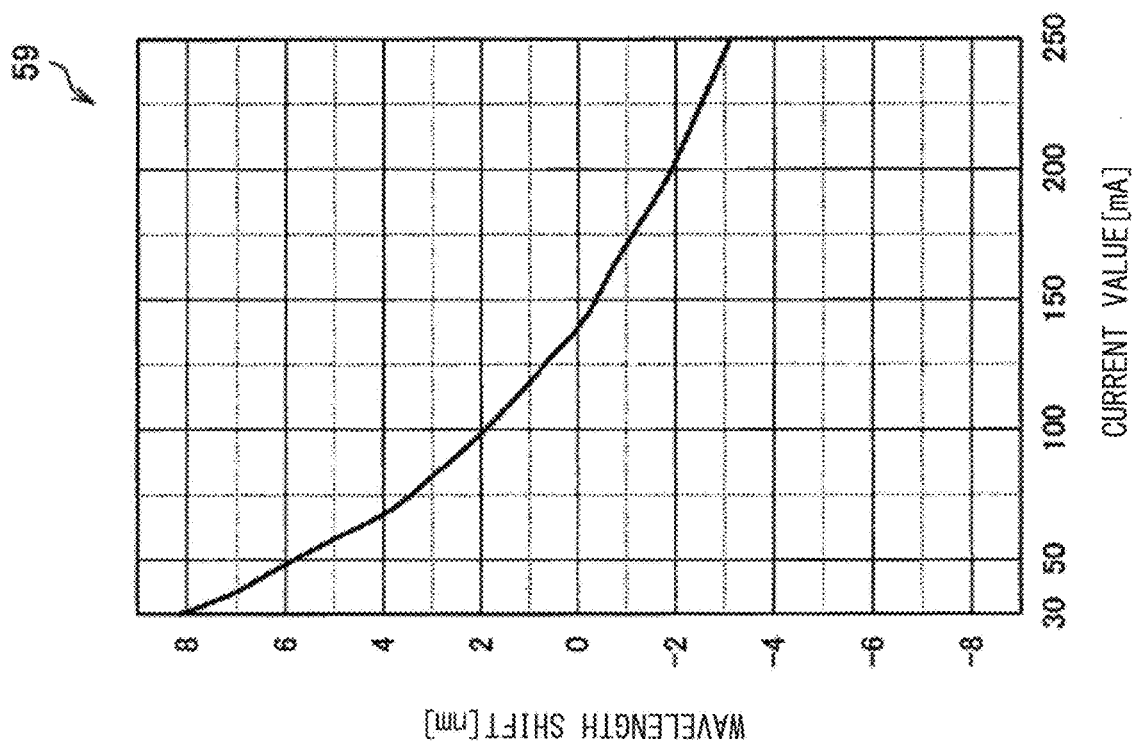
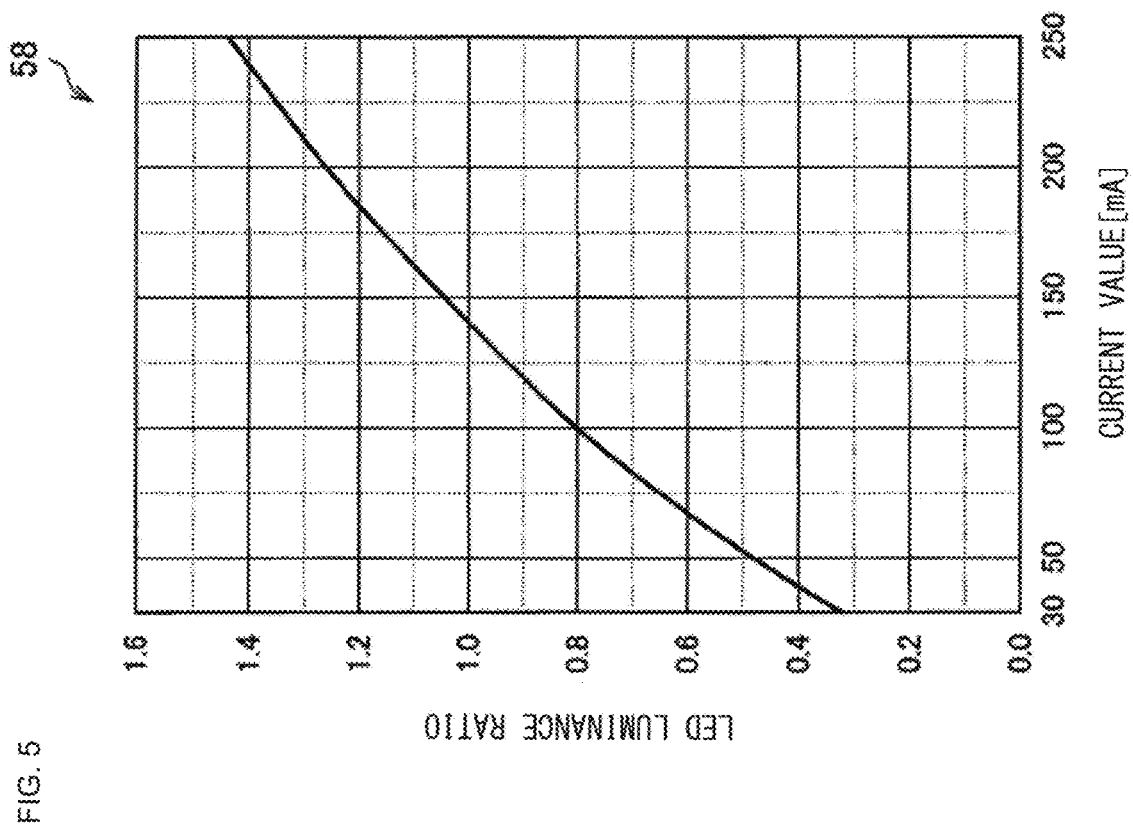

DISPLAY APPARATUS, DISPLAY CONTROL METHOD, AND RECORDING MEDIUM

CROSS REFERENCE TO RELATED APPLICATIONS

This application is a U.S. National Phase of International Patent Application No. PCT/JP2019/033288 filed on Aug. 26, 2019, which claims priority benefit of Japanese Patent Application No. JP 2018-170684 filed in the Japan Patent Office on Sep. 12, 2018. Each of the above-referenced applications is hereby incorporated herein by reference in its entirety.

TECHNICAL FIELD

The present disclosure relates to a display apparatus, a display control method, and a recording medium.

BACKGROUND ART

In recent years, a technology called Augmented Reality (AR) has been attracting attention, in which additional information is superimposed on a real world and presented to a user. An optical see-through display apparatus such as a transmissive HMD (Head Mounted Display) is used for information presentation using AR technology. The optical see-through display apparatus often includes an optical engine that generates light representing gray scales (hereinafter also referred to as image light) for respective pixels, and a combiner that diffracts the image light while allowing light from a real world to be transmitted therethrough and outputs, to eyes of the user, the image light together with the light from the real world. The optical see-through display apparatus is still in the early days of development, and various technologies have been developed to improve performance.

For example, the following PTL 1 discloses a technology for reducing color unevenness and luminance unevenness in a transmissive HMD using a hologram light guide plate for a combiner.

CITATION LIST

Patent Literature

PTL 1: Japanese Unexamined Patent Application Publication No. 2007-94175

SUMMARY OF THE INVENTION

Problems to be Solved by the Invention

In an optical see-through display apparatus, a light emission wavelength of a light source that generates image light may be changed in a case where luminance is controlled. A combiner typically has wavelength selectivity; therefore, diffraction efficiency of the combiner differs depending on wavelength. Accordingly, in a case where change in the light emission wavelength occurs, the change unintentionally affects luminance, which may cause difficulty in accurately controlling luminance.

The present disclosure therefore provides a mechanism that allows for more accurate luminance control in an optical see-through display apparatus.

Means for Solving the Problems

According to the present disclosure, there is provided a display apparatus including an optical see-through display apparatus, the display apparatus including: a light source that emits light; a combiner including a diffraction member that diffracts light incident from the light source and outputs the light; and a controller that controls light emission of the light source, the controller controlling a light output of the light source on the basis of a wavelength of light outputted from the light source and diffraction efficiency of the combiner that is changed resulting from change in a wavelength of incident light.

In addition, according to the present disclosure, there is provided a display control method including a display control method of an optical see-through display apparatus, the optical see-through display apparatus including a light source that emits light and a combiner including a diffraction member that diffracts light incident from the light source and outputs the light, the display control method including: controlling a light output of the light source on the basis of a wavelength of light outputted from the light source and diffraction efficiency of the combiner that is changed resulting from change in a wavelength of incident light.

In addition, there is provided a recording medium storing a program causing a computer that controls an optical see-through display apparatus to function as a controller, the optical see-through display apparatus including a light source that emits light and a combiner including a diffraction member that diffracts light incident from the light source and outputs the light, and the controller that controls a light output of the light source on the basis of a wavelength of light outputted from the light source and diffraction efficiency of the combiner that is changed resulting from change in a wavelength of incident light.

Effects of the Invention

As described above, according to the present disclosure, there is provided a mechanism that allows for more accurate luminance control in the optical see-through display apparatus. It is to be noted that the above-described effects are not necessarily limitative. In addition to or in place of the above-described effects, there may be achieved any of effects described in the present specification or other effects that may be grasped from the present specification.

BRIEF DESCRIPTION OF DRAWINGS

FIG. 5 is an explanatory diagram of an example in which a light emission wavelength of an LED is changed by current value control.

MODES FOR CARRYING OUT THE INVENTION

Hereinafter, preferred embodiments of the present disclosure are described in detail with reference to the accompanying drawings. It is to be noted that, in this description and the accompanying drawings, components that have substantially the same functional configuration are indicated by the same reference signs, and thus redundant description thereof is omitted.

It is to be noted that description is given in the following order.

1. Overview
　1.1. Hardware Configuration Examples
　1.2. Gray-scale Representation Method
　1.3. Light Modulation Systems
　1.4. Technical Issues
　1.5. Overview of Proposed Technology
2. First Embodiment
3. Second Embodiment
4. Third Embodiment
5. Fourth Embodiment
6. Conclusion 1. Overview An overview of an optical see-through display apparatus according to an embodiment of the present disclosure is described below. It is to be noted that a transmissive HMD is described below as an example of the optical see-through display apparatus.

In addition, in the present specification, LED luminance is a value obtained by integrating the product of a light output of an LED and a luminosity function of a human with a wavelength. The light output is intensity of light emitted from the LED. Display luminance is a value obtained by integrating the product of a diffraction spectrum, an light output of an LED, and a luminosity function with a wavelength. In a case where it is not particularly necessary to distinguish between the LED luminance and the display luminance, the LED luminance and the display luminance are also simply collectively referred to as luminance.

1.1. Hardware Configuration Examples

Hardware configuration examples of the transmissive HMD according to the present embodiment are described below.

(1) First Hardware Configuration Example

A first hardware configuration example is a configuration example including one diffraction member. The first hardware configuration example is described with reference to FIG. 1.

Figure 1:
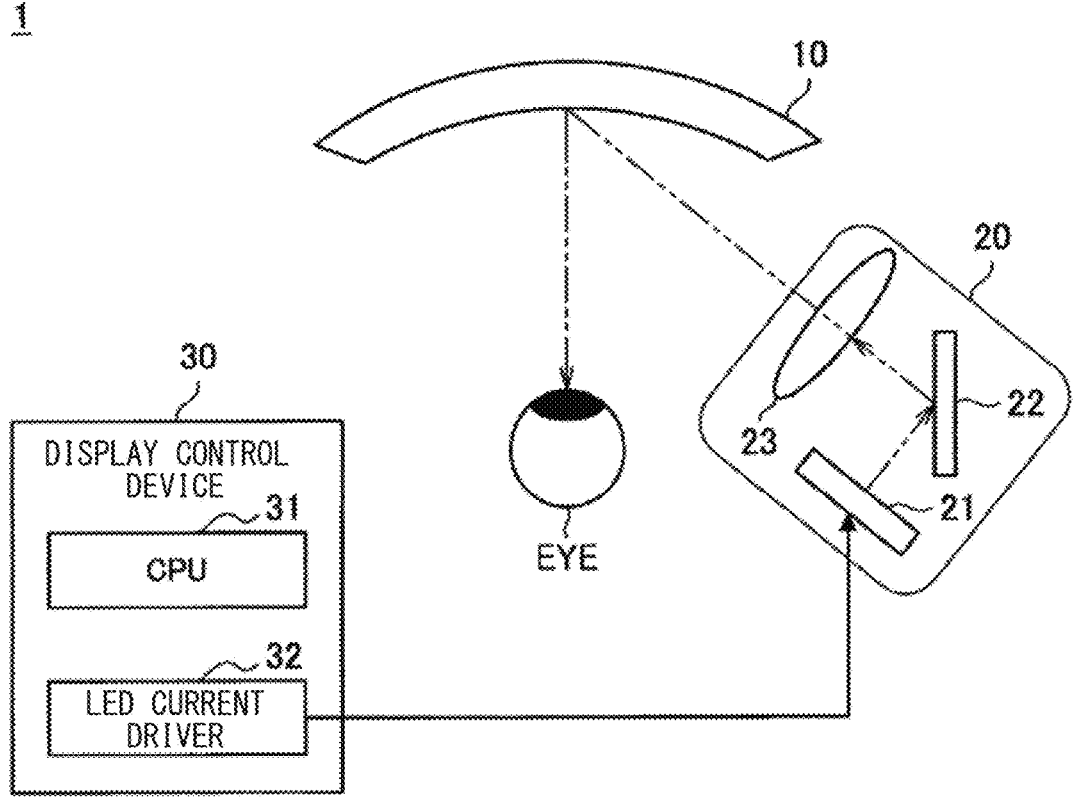
FIG. 1 is a diagram illustrating a first hardware configuration example of a transmissive HMD according to an embodiment of the present disclosure.

FIG. 1 is a diagram illustrating the first hardware configuration example of the transmissive HMD according to the present embodiment. As illustrated in FIG. 1, a transmissive HMD 1 according to the first hardware configuration example includes a combiner 10, an optical engine 20, and a display control device 30.

Combiner 10

The combiner 10 is a member including at least one diffraction member that diffracts light incident from a light source and outputs the light. The combiner 10 diffracts light incident from the optical engine 20 (more specifically, a light source 21) and outputs the light to eyes of a user (that is, a viewer).

The diffraction member included in the combiner 10 may be of a transmissive type or a reflective type. The diffraction member included in the combiner 10 according to the present embodiment is of the reflective type. The combiner 10 diffracts image light incident from the optical engine 20 (more specifically, the light source 21) while allowing light from a real world to be transmitted therethrough, and outputs, to the eyes of the user, the image light together with the light from the real world.

As the diffraction member, for example, a hologram or a plane diffraction grating may be used. In the present embodiment, a hologram is used as the diffraction member. In this case, the combiner 10 is also referred to as a hologram light guide plate or a hologram lens. In a first illustrated example, the combiner 10 includes one diffraction member. In the first illustrated example, the combiner 10 is also referred to as an output hologram.

The combiner 10 is often designed to provide the highest diffraction efficiency at a default light emission wavelength of the optical engine 20 (more specifically, the light source 21). The default light emission wavelength is a light emission wavelength when the light source 21 is driven at a default current value. In addition, the default current value is a current value fixedly used in PWM control.

Optical Engine 20

The optical engine 20 is a device that generates image light and outputs the image light to the combiner 10. The optical engine 20 includes the light source 21, a display element 22, and a lens 23.

The light source 21 is a device that emits light as a source of image light. As the light source 21, for example, an LED (light emitting diode) or a laser light source may be used. In the present embodiment, the light source 21 is an LED. For example, an LED 21 generates and outputs green light.

The display element 22 is a device that generates image light with use of the light incident from the LED 21 and outputs the image light. The display element 22 turns ON/OFF image light for each pixel. The display element 22 outputs light incident from the LED 21 to outside for an "ON" pixel, and does not output the light incident from the LED 21 to outside for an "OFF" pixel. The display element 22 generates image light in such a manner. As the display element 22, for example, an MEMS (micro electro mechanical system) mirror or a ferroelectric liquid crystal display element may be used. In the present embodiment, the display element 22 is an MEMS mirror.

The lens 23 is a member that refracts and outputs the image light incident from the MEMS mirror 22. The lens 23 is implemented, for example, as a collimating optical system that converts a light flux of the incident image light into a parallel light flux.

Display Control Device 30

The display control device 30 is a device that controls image display by the transmissive HMD 1. The display control device 30 includes a CPU (Central Processing Unit) 31 and an LED current driver 32.

The CPU 31 functions as an arithmetic processing device and a control device, and is a device that controls an overall operation in the transmissive HDM 1 in accordance with various programs. For example, the CPU 31 controls the LED current driver 32 to indirectly control an operation of the optical engine 20. For example, the CPU 31 performs current value control to be described later, and outputs, to the LED current driver 32, information indicating a current value that is supposed to be supplied to the LED 21. Processing to be performed by the CPU 31 in the present embodiment may be performed by an MPU, a DSP, and/or an electronic circuit.

The LED current driver 32 is a device that controls a current to be supplied to the LED 21. For example, the LED current driver 32 generates an ON/OFF waveform (a PWM pulse to be described later) of a current to be supplied to the LED 21 on the basis of a light emission trigger signal outputted from a controller of the MEMS mirror 22. At this time, the LED current driver 32 may perform the PWM control to be described later. It is to be noted that the light emission trigger signal includes timing information indicating timings of light emission start/stop of the LED 21 for turning ON/OFF the LED 21 in synchronization with ON/OFF of a pixel in the MEMS mirror 22. The LED 21 is supplied with a current indicating the waveform generated by the LED current driver 32.

It is to be noted that the display control device 30 (that is, the CPU 31 and the LED current driver 32) functions as a controller that controls light emission of the LED 21. The CPU 31 and the LED current driver 32 may share processing optionally. For example, in the present specification, processing described as being performed by each of the CPU 31 and the LED current driver 32 may be performed by one of the CPU 31 and the LED current driver 32.

(2) Second Hardware Configuration Example

A second hardware configuration example is a configuration example including two diffraction members. The second hardware configuration example is described with reference to FIG. 2.

Figure 2:
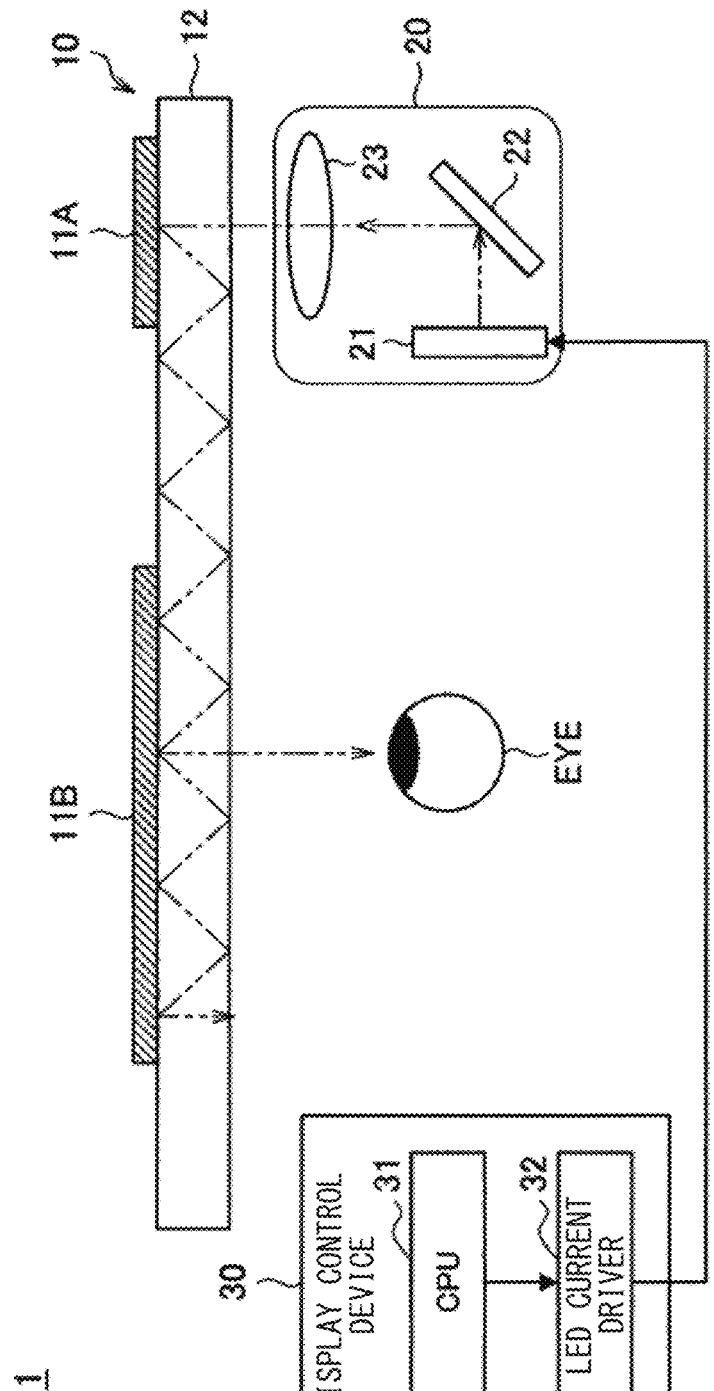
FIG. 2 is a diagram illustrating a second hardware configuration example of the transmissive HMD according to the same embodiment.

FIG. 2 is a diagram illustrating the second hardware configuration example of the transmissive HMD according to the present embodiment. As illustrated in FIG. 2, the transmissive HMD 1 according to the second hardware configuration example includes the combiner 10. the optical engine 20, and the display control device 30. The transmissive HMD 1 according to the first hardware configuration example and the transmissive HMD 1 according to the second hardware configuration example are the same, except that configuration of the combiner 10 is different. The configuration of the combiner 10 is described below.

The combiner 10 according to the present configuration example includes holograms 11A and 11B, and a transparent plate 12.

The hologram 11A is provided in a direction where image light is outputted by the optical engine 20, and the hologram 11B is provided in front of an eye of a user (that is, a viewer). The hologram 11A diffracts light incident from the optical engine 20 and outputs the light. The image light outputted from the hologram 11A reaches the hologram 11B while repeating total reflection inside the transparent plate 12. The hologram 11B diffracts light incident via the transparent plate 12 and outputs the light toward the eye of the user. The hologram 11A may be also referred to as an incident-side hologram. The hologram 11B may be also referred to as an output-side hologram.

1.2. Gray-Scale Representation Method

A gray-scale representation method using the MEMS mirror 22 includes a method of representing gray scales for each color with a plurality of bits. As one example thereof, green gray-scale representation is descried with reference to FIG. 3.

Figure 3:
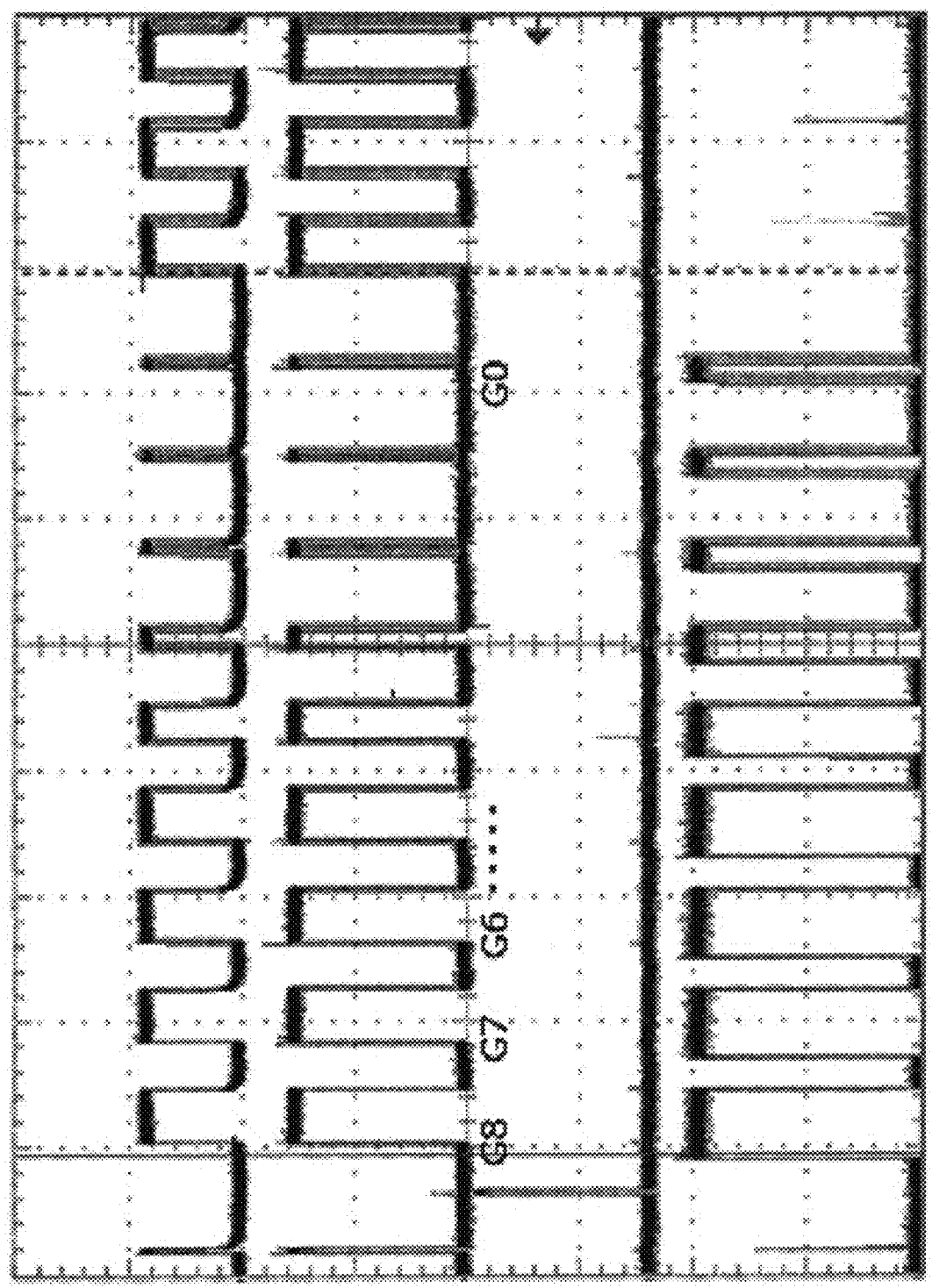
FIG. 3 is an explanatory diagram of an example of a gray-scale representation method in the transmission HMD according to the same embodiment.

FIG. 3 is an explanatory diagram of an example of a gray-scale representation method in the transmissive HMD 1 according to the present embodiment. A graph 50 in a first row indicates a waveform of image light. A graph 51 in a second row indicates a drive waveform of the LED 21. A graph 52 in a third row indicates a waveform of a VSYNC. A graph 53 in a fourth row indicates a waveform of a light emission trigger signal (light emission start/stop timing information) for turning ON/OFF the LED 21 in synchronization with ON/OFF of a pixel in the MEMS mirror 22. In these graphs, a horizontal axis indicates time, and time flows from the left to the right. In addition, a vertical axis indicates ON/OFF, and OFF has an amplitude of 0. In the example illustrated in FIG. 3, green gray scales are represented with total nine bits of a 0-bit to an 8-bit (G0 to G8). In a case where the bit is 1, the image light is outputted, and in a case where the bit is 0, the image light is not outputted. Combining ON/OFF states of these bits makes it possible to represent 9-bit gray scales.

1.3. Light Modulation Systems

Examples of a light modulation system that may be adopted by the transmissive HMD according to the present embodiment include PWM (Pulse Width Modulation) control and current value control.

(1) PWM Control

The PWM control is a method of controlling magnitude of luminance by controlling a length of a light emission width by a light source. In the PWM control, a time width from start to end of light emission indicated by a light emission trigger is defined as luminance of 100%, and the light emission width is controlled in accordance with target luminance. The longer the light emission width is, the higher luminance is achieved, and the shorter the light emission width is, the lower luminance is achieved. The PWM control is described with reference to FIG. 4.

Figure 4:
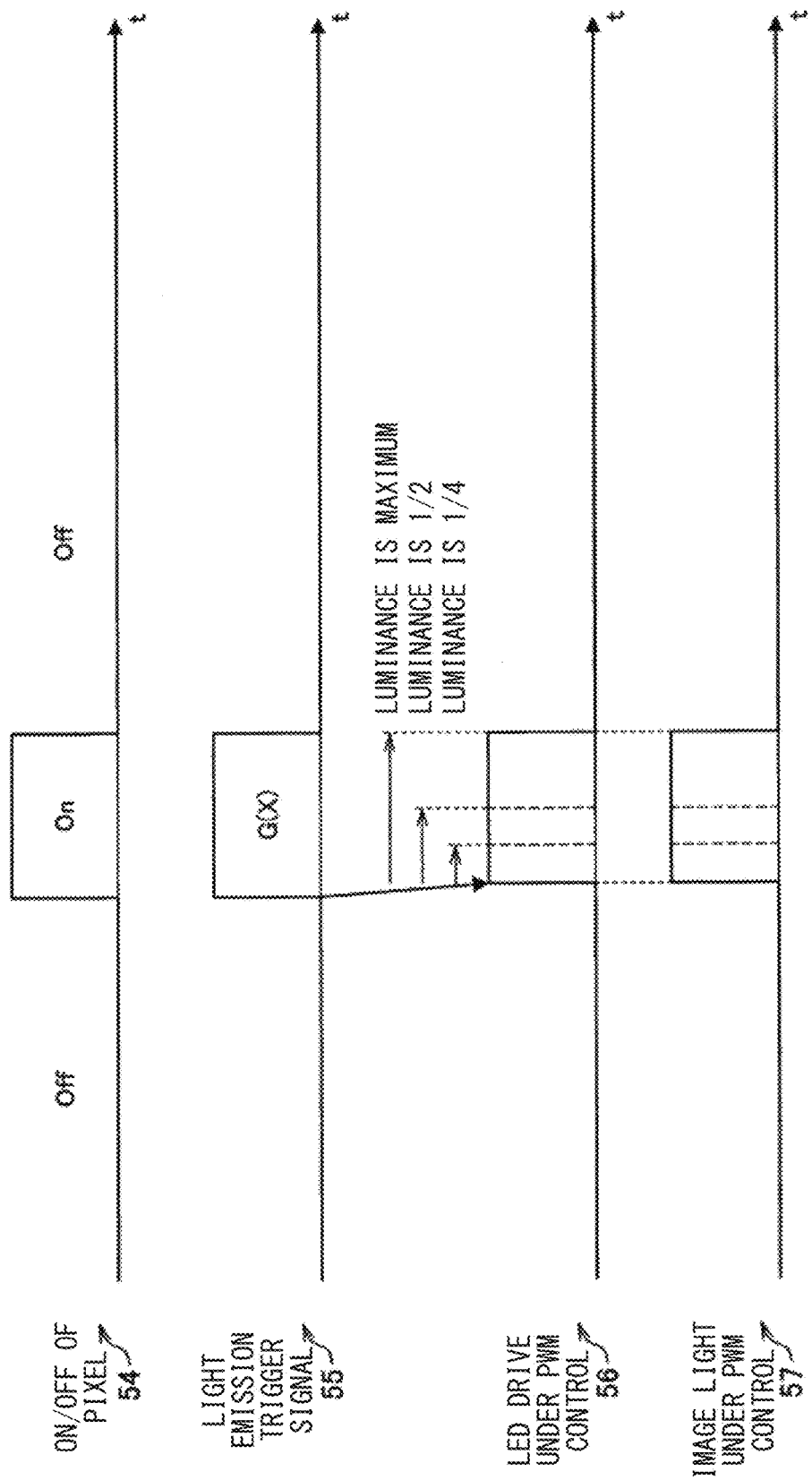
FIG. 4 is an explanatory diagram of an example of PWM control in the transmission HMD according to the same embodiment.

FIG. 4 is an explanatory diagram of an example of PWM control in the transmissive HMD 1 according to the present embodiment. FIG. 4 illustrates PWM control in a case where one bit in the gray-scale representation illustrated in FIG. 3 is 1. A graph 54 in a first row indicates an ON/OFF waveform of a pixel in the MEMS mirror 22. A graph 55 in a second row indicates a waveform of a light emission trigger signal (light emission start/end timing information) for turning ON/OFF the LED 21 in synchronization with ON/OFF of the pixel in the MEMS mirror 22. A graph 56 in a third row indicates a drive waveform of the LED 21 under the PWM control. A graph 57 in a fourth row indicates an ON/OFF waveform of image light under the PWM control. In these graphs, a horizontal axis indicates time, and time flows from the left to the right. In addition, a vertical axis indicates ON/OFF, and OFF has an amplitude of 0. As illustrated in the graph 56 and the graph 57, in a case where the light emission width of the LED 21 is 100%, a light emission width of image light also becomes maximum, which causes luminance to become maximum. In addition, in a case where the light emission width of the LED 21 is ½ and ¼, the light emission width of the image light becomes ½ and ¼, which causes the luminance to become ½ and ¼.

Such control is performed by the LED current driver 32, for example. The LED current driver 32 holds a time width of 100% of each bit as a table.

(2) Current Value Control

The current value control is a method of controlling magnitude of luminance by determining a current value to be supplied to a light source. Typically, in a case where the current value control is performed, the current value is controlled after fixing a light emission width of a PWM pulse. The higher the current value to be supplied to the light source is, the higher luminance becomes, and the lower the current value to be supplied to the light source is, the lower luminance becomes. However, in a case where luminance is controlled by the current value control, a dominant wavelength (corresponding to a light emission wavelength) of the LED may be changed. This point is described with reference to FIG. 5.

FIG. 5 is an explanatory diagram of an example in which the light emission wavelength of the LED 21 is changed by the current value control. A graph 58 is a graph indicating LED luminance ratio-current characteristics of an LED "LT G6SP" (green) manufactured by OSRAM (registered trademark) Opto Semiconductors GmbH. A graph 59 is a graph indicating wavelength shift-current characteristics of the same LED. As illustrated in the graph 58, with use of a current value of 140 mA as a reference (an LED luminance ratio of 1.0), decreasing the current value to 50 mA causes a LED luminance ratio to be decreased to about 0.5. However, as illustrated in the graph 59, the dominant wavelength is shifted by about +6 nm by decreasing the current value from 140 mA to 50 mA. This is caused by that the dominant wavelength of the LED is 528 nm at a current value of 140 mA and about 534 nm at a current value of 50 mA.

1.4. Technical Issues

In a method of decreasing LED luminance by the PWM control, it is difficult to represent an LSB (least significant bit) of gray scales at predetermined luminance or less.

As one example, in consideration of a display luminance range in a case where the transmissive HMD 1 operates in an 8-bit gray-scale representation at a frame rate of 60 fps and one field per frame, a time width of a minimum bit is (1 s/60)/255=65 us. If the rise time and the fall time of a current waveform of the LED 21 need about 4 us in total by a parasitic capacitance and the like, in the PWM control, it is possible to reduce the light emission time width to 4 us. Accordingly, assuming that a time width from start to end of light emission indicated by a light emission trigger is luminance of 100%, a lower limit of display luminance achievable by the PWM control is 4 us/65 us=about 6%.

In such a manner, the LED luminance has the lower limit under the assumption that the LSB of gray scales is represented, which may cause a user to perceive that image light is glaring under a condition that ambient light is dark. Accordingly, a mechanism is desired to expand a dynamic range of luminance to a luminance side lower than the lower limit of the display luminance achievable by the PWM control.

In addition, in a method of decreasing the display luminance by the current value control, accurate control of the display luminance may be difficult. As described above with reference to FIG. 5, in a case where the current value control is performed to decrease LED luminance, the light emission wavelength is changed. Diffraction efficiency of the combiner differs depending on wavelength; therefore, in a case where the light emission wavelength is changed by the current value control, such change may unintentionally affect the display luminance. Accordingly, a mechanism is desired to allow for more accurate control of display luminance in a case where the display luminance is decreased by the current value control.

1.5. Overview of Proposed Technology

An overview of a proposal technology for solving the above-described technical issues is described below.

A first point of the proposed technology is dynamically changing a light modulation system from the PWM control to current control after decreasing luminance to a lower limit value by the PWM control. This makes it possible to expand the dynamic range of luminance to a lower luminance side. For example, in a case where an LED having characteristics described above with reference to FIG. 5 is used, luminance is decreased to 6% by the PWM control at a current value fixed at 140 mA, and thereafter the current value is decreased to 50 mA, which makes it possible to further decrease the luminance.

As described above with reference to FIG. 5, in a case where the luminance of the LED is decreased by the current value control, the light emission wavelength is also changed. This makes it possible to achieve a further decrease in display luminance. Specifically, for the purpose of enhancing diffraction efficiency of the combiner, the PWM control is often performed after the light emission wavelength is fixed at the highest wavelength. Accordingly, in a case where LED luminance is decreased by the current value control, the diffraction efficiency of the combiner is decreased by a shift of the light emission wavelength associated with such a decrease, which makes it possible to further decrease the display luminance.

A second point of the proposed technology is controlling a light output of a light source that generates image light on the basis of the light emission wavelength and the diffraction efficiency of the combiner. As described above with reference to FIG. 5, in a case where the current value control is performed to decrease the LED luminance, the light emission wavelength is changed. In addition, the diffraction efficiency of the combiner differs depending on wavelength. Accordingly, in a case where the light emission wavelength is changed, such a change affects the display luminance. In this respect, according to the proposed technology, the light output is controlled on the basis of the light emission wavelength and the diffraction efficiency of the combiner, which makes it possible to achieve more accurate luminance control.

A third point of the proposed technology is performing feedback control. This makes it possible to achieve desired luminance more accurately.

A fourth point of the proposed technology is performing luminance control on the basis of intensity (or luminous intensity) of ambient light (that is, outside light). Wavelength characteristics of a luminosity function of a user are changed in accordance with the intensity of the ambient light. Accordingly, the display luminance is changed in accordance with the intensity of the ambient light. In this respect, according to the proposed technology, performing luminance correction in consideration of change in the wavelength characteristics of the luminosity function of the user makes it possible to accurately achieve desired luminance at any location of the intensity of ambient light.

A fifth point of the proposed technology is using light sources of a plurality of colors in combination. Changing a color to be used from a color having a relatively high luminosity function to a color having a relatively low luminosity function makes it possible to further decrease the display luminance.

2. First Embodiment

A first embodiment relates to the first point and the second point of the proposed technology. That is, the first embodiment is an embodiment in which the light modulation system is dynamically changed from the PWM control to the current control, and the current value control is performed on the basis of diffraction efficiency of the combiner 10 that is changed in accordance with a wavelength of incident light. The first embodiment is described in detail below with reference to FIGS. 6 to 9. It is to be noted that the transmissive HMD 1 according to the present embodiment is implementable in any configuration of the first hardware configuration example described above with reference to FIG. 1 and the second hardware configuration example described above with reference to FIG. 2.

(1) Display Luminance Control

Figure 6:
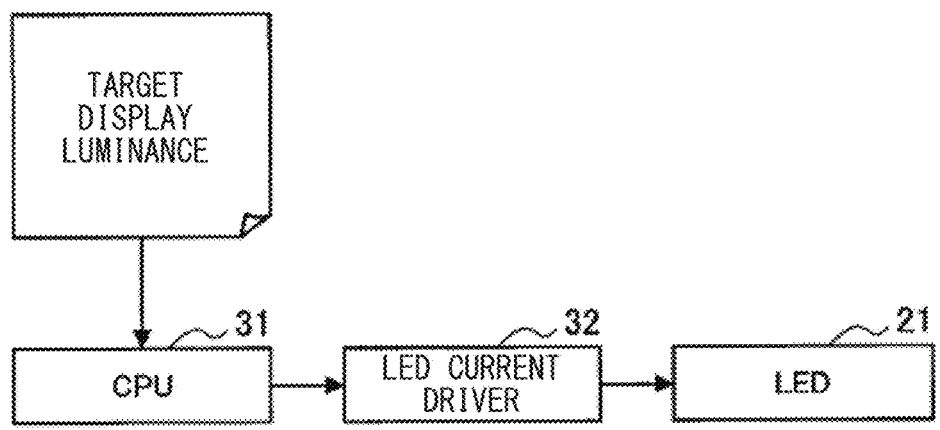
FIG. 6 is a diagram illustrating components and information involved in display luminance control by a transmissive HMD according to a first embodiment.

FIG. 6 is a diagram illustrating components and information involved in display luminance control by the transmissive HMD 1 according to the present embodiment. As illustrated in FIG. 6, the CPU 31, the LED current driver 32, and the LED 21, as well as target display luminance are involved in the display luminance control according to the present embodiment.

The CPU 31 controls a light output of the LED 21 on the basis of a wavelength of light outputted from the LED 21, and diffraction efficiency of the combiner 10 that is changed resulting from change in a wavelength of incident light. Specifically, the CPU 31 performs the current value control on the basis of a light emission wavelength of the LED 21 that differs depending on a current value to be supplied, and the diffraction efficiency of the combiner 10 that differs depending on wavelength. This makes it possible for the CPU 31 to achieve accurate luminance control in consideration of the light emission wavelength that is changed resulting from the current value control, and change given to display luminance by change in the light emission wavelength and characteristics of the diffraction efficiency of the combiner. The CPU 31 outputs information indicating a determined current value to the LED current driver 32.

As illustrated in FIG. 6, the target display luminance is inputted to the CPU 31. The target display luminance is information indicating a target value of the display luminance. The target display luminance may be inputted by a user, or may be inputted by an application such as an AR application.

The CPU 31 controls the light output of the LED 21 to cause display luminance of light to be outputted from the combiner 10 to become the target display luminance. Specifically, the CPU 31 controls an increase or decrease in a current value to be supplied to the LED 21 to cause the display luminance of light to be outputted from the combiner 10 to become the target display luminance. Here, the display luminance is calculated by integrating the product of spectral radiant intensity of the LED 21, a luminosity function, and a diffraction spectrum with a wavelength. That is, the display luminance is calculated by the following expression.

[Math 1]

$$IL = \int_0^\infty I(\lambda) \times K(\lambda) \times \tau(\lambda) d\lambda \qquad (1)$$

Here, $\lambda$ is a wavelength. IL is display luminance. $I(\lambda)$ is spectral radiant intensity at the wavelength $\lambda$. $K(\lambda)$ is a luminosity function at the wavelength $\lambda$. $\tau(\lambda)$ is diffraction efficiency at the wavelength $\lambda$ of the combiner 10. As $K(\lambda)$, a luminosity function for photopic vision (ambient light is 1 cd/m^2 or more) is typically used It is to be noted that in a case where the combiner 10 includes a plurality of holograms 11, $\tau(\lambda)$ is the product of diffraction efficiencies at the wavelengths $\lambda$ of the respective holograms 11.

Figure 7:
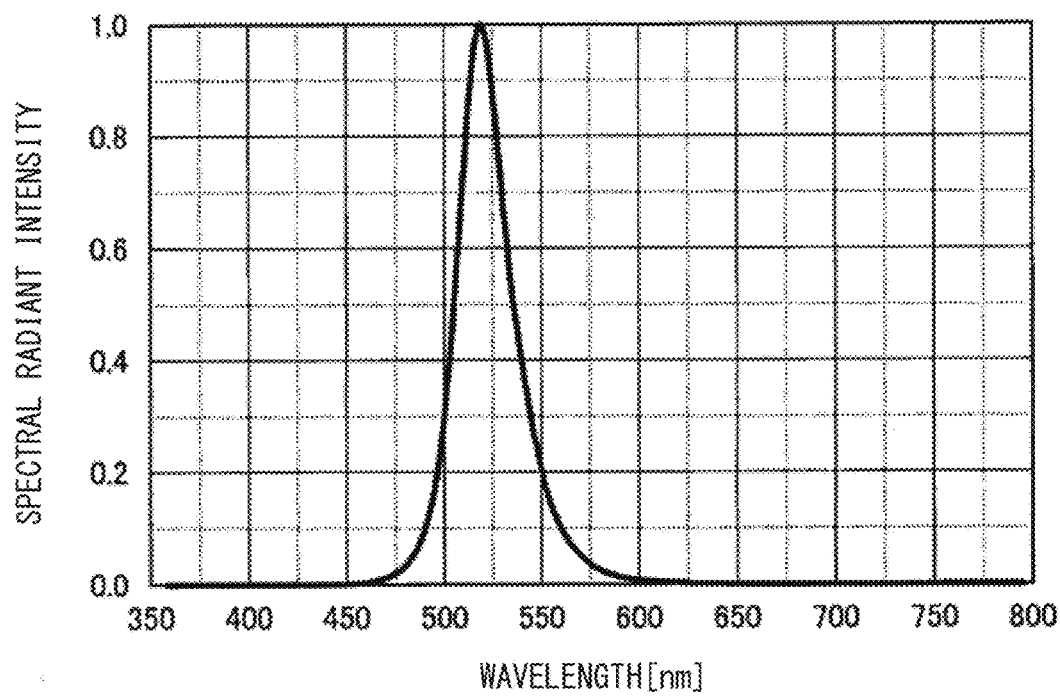
FIG. 7 is a graph illustrating an example of spectral radiant intensity of an LED.

FIG. 7 illustrates one example of spectral radiant intensity of the LED 21. FIG. 7 is a graph illustrating the one example of the spectral radiant intensity of the LED 21. This graph indicates spectral radiant intensity when a current value of an LED "LT G6SP" (green) manufactured by OSRAM (registered trademark) Opto Semiconductors GmbH is 140 mA. In this graph, a horizontal axis indicates a light emission wavelength, and a vertical axis indicates intensity of light.

The CPU 31 determines a current value to be supplied to the LED 21 to cause display luminance calculated by the above-described mathematical expression (1) to become the target display luminance.

The CPU 31 performs the PWM control in a case where the target display luminance is equal to or greater than a first threshold value, and performs the current control value in a case where the target display luminance is less than the first threshold value. Here, the first threshold value is a lower limit value of display luminance achievable by the PWM control. For example, in a case where the transmissive HMD 1 operates in an 8-bit gray-scale representation at a frame rate of 60 fps and one field per frame, the first threshold value is display luminance corresponding to a display luminance ratio of 6%. The CPU 31 decreases the light emission width to the shortest width by the PWM control and decreases the display luminance to a lower limit of the display luminance achievable by the PWM control, and thereafter performs the current value control while maintaining the light emission width at the shortest width, thereby further decreasing the display luminance. This makes it possible to expand the dynamic range of luminance to a luminance side lower than the lower limit of the display luminance achievable by the PWM control.

LED Current Driver 32

The LED current driver 32 causes the LED 21 to emit light on the basis of control by the CPU 31. For example, in a case where the target display luminance is equal to or greater than the first threshold value, the LED current driver 32 generates a PWM pulse having a light emission width corresponding to the target display luminance, and outputs the PWM pulse to the LED 21. In addition, in a case where the target luminance is less than the first threshold value, the LED current driver 32 sets the current value to be supplied to the LED 21 to a current value determined by the CPU 31 while generating a PWM pulse having the shortest light emission width and outputting the PWM pulse to the LED 21.

LED 21

The LED 21 emits light on the basis of control by the LED current driver 32.

(2) Specific Examples

Specific control examples of the display luminance by the transmissive HMD 1 are described with reference to FIGS. 8 and 9.

It is to be noted that in the following specific examples, an LED luminance ratio is a ratio of LED luminance with use of LED luminance at a default current value as a reference. The default current value is 140 mA. In addition, a display luminance ratio is a ratio with use of display luminance at the default current value as a reference.

Transmissive HMD 1 According to First Hardware Configuration Example

Figure 8:
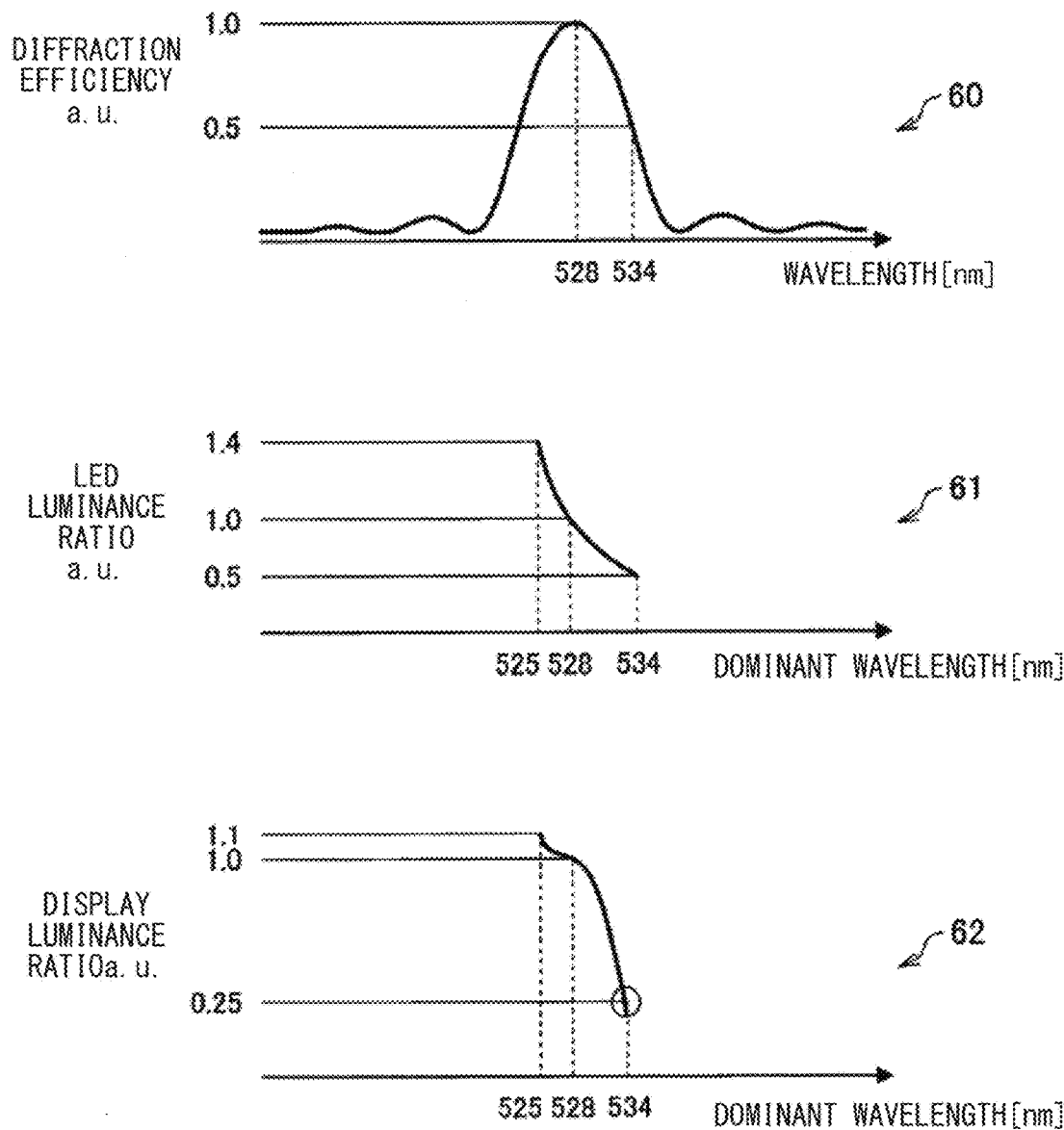
FIG. 8 is an explanatory diagram of a control example of display luminance in an transmissive HMD according to the first hardware configuration example illustrated in FIG. 1.

FIG. 8 is an explanatory diagram of a control example of the display luminance in the transmissive HMD 1 according to the first hardware configuration example illustrated in FIG. 1. A graph 60 is a graph indicating a design example of a diffraction spectrum of the combiner 10 (an output hologram) of the transmissive HMD 1 according to the first hardware configuration example. In the graph 60, a horizontal axis indicates a wavelength, and a vertical axis indicates diffraction efficiency. A graph 61 is a graph indicating an example of an LED luminance ratio of the LED 21 of the transmissive HMD 1 according to the first hardware configuration example. In the graph 61, a horizontal axis indicates a dominant wavelength of the LED 21, and a vertical axis indicates the LED luminance ratio. A graph 62 is a graph indicating an example of a display luminance ratio in the transmissive HMD 1 according to the first hardware configuration example. In the graph 62, a horizontal axis indicates the dominant wavelength of the LED 21, and a vertical axis indicates the display luminance ratio.

As described above with reference to FIG. 5, the current value is decreased from 140 mA to 50 mA by the current value control, which decreases the LED luminance ratio from 1 to 0.5, and shifts the dominant wavelength by +6 nm from 528 nm to 534 nm. This is also illustrated in the graph 61. As illustrated in the graph 60, in a case where the dominant wavelength is shifted by +6 nm from the 528 nm to 534 nm, diffraction efficiency at the dominant wavelength of the combiner 10 is decreased from 1.0 to 0.5. As a result, as illustrated in the graph 62, in a case where the dominant wavelength is shifted by +6 nm from 528 nm to 534 nm, the display luminance ratio at the dominant wavelength is calculated by integrating the diffraction spectrum, the spectral radiant intensity of the LED, and the luminosity function, and is decreased from 1.0 to 0.25.

As described above, the CPU 31 makes it possible to decrease the display luminance ratio from 1.0 to 0.25 by decreasing from 140 mA to 50 mA. For example, assuming that the lower limit of the display luminance achievable by the PWM control is 6%, it is possible to decrease the display luminance to 6%×(0.25/1)=1.5% by such current value control. That is, in a case where the target display luminance is 1.5%, the CPU 31 decreases the current value from 140 mA to 50 mA, which makes it possible to achieve the target display luminance.

Transmissive HMD 1 According to Second Hardware Configuration Example

Figure 9:
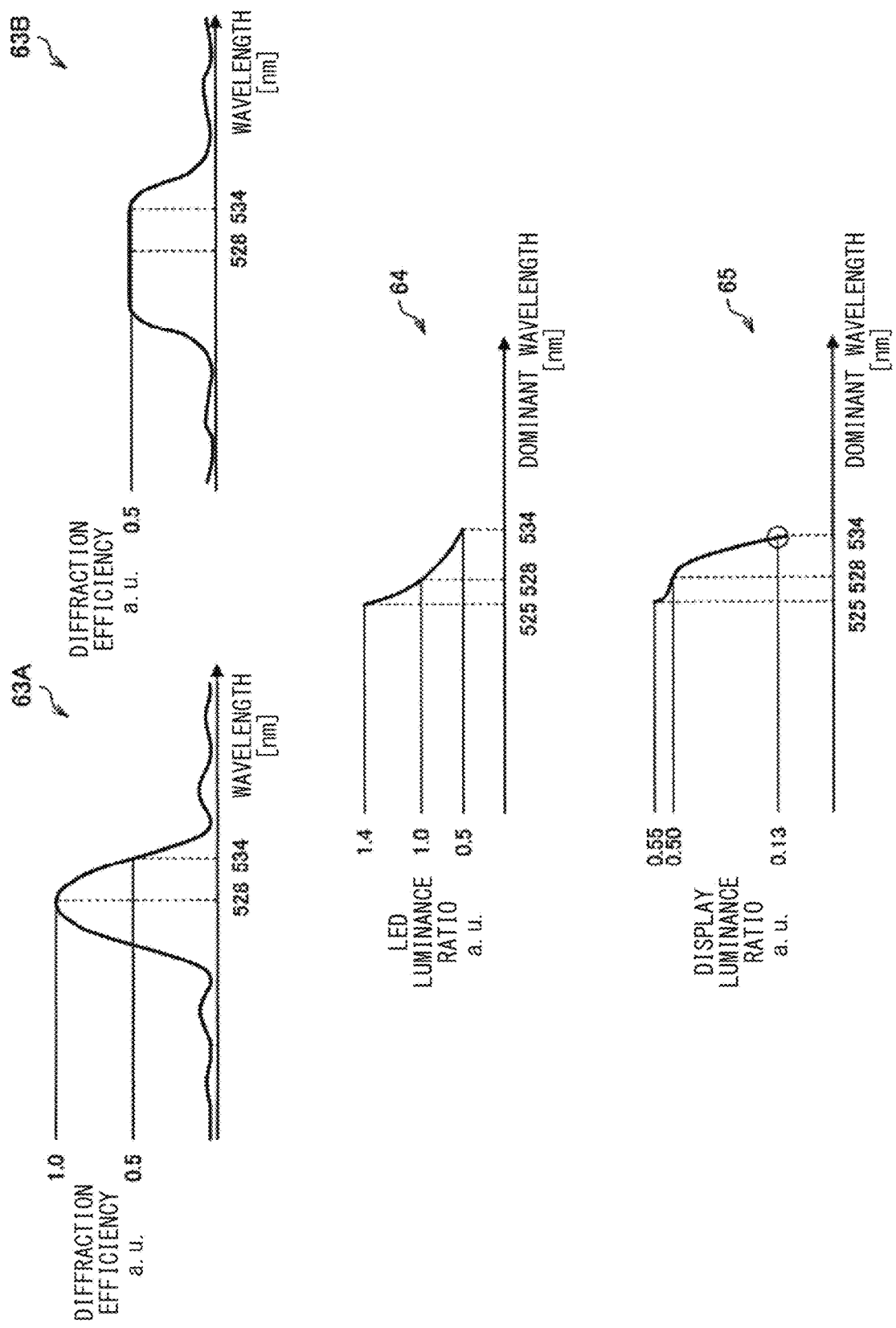
FIG. 9 is an explanatory diagram of a control example of display luminance in an transmissive HMD according to the second hardware configuration example illustrated in FIG. 2.

FIG. 9 is an explanatory diagram of a control example of display luminance in the transmissive HMD 1 according to the second hardware configuration example illustrated in FIG. 2. A graph 63A is a graph indicating a design example of a diffraction spectrum of a hologram 11A (an incident-side hologram) of the transmissive HMD 1 according to the second hardware configuration example. In the graph 63A, a horizontal axis indicates a wavelength, and a vertical axis indicates diffraction efficiency. A graph 63B is a graph indicating a design example of a diffraction spectrum of a hologram 11B (an output-side hologram) of the transmissive HMD 1 according to the second hardware configuration example. In the graph 63B, a horizontal axis indicates a wavelength, and a vertical axis indicates diffraction efficiency. A graph 64 is a graph indicating an example of an LED luminance ratio of the LED 21 of the transmissive HMD 1 according to the second hardware configuration example. In the graph 64, a horizontal axis indicates the dominant wavelength of the LED 21, and a vertical axis indicates the LED luminance ratio. A graph 65 is a graph indicating an example of a display luminance ratio in the transmissive HMD 1 according to the first hardware configuration example. In the graph 65, a horizontal axis indicates the dominant wavelength of the LED 21, and a vertical axis indicates the display luminance ratio.

As described above with reference to FIG. 5, the current value is decreased from 140 mA to 50 mA by the current value control, which decreases the LED luminance ratio from 1 to 0.5, and shifts the dominant wavelength by +6 nm from 528 nm to 534 nm. This is also illustrated in the graph 64. As illustrated in the graph 63A, in a case where the dominant wavelength is shifted by +6 nm from 528 nm to 534 nm, the diffraction efficiency at the dominant wavelength of the hologram 11A is decreased from 1.0 to 0.5. As illustrated in the graph 63B, in a case where the dominant wavelength is shifted by +6 nm from 528 nm to 534 nm, the diffraction efficiency at the dominant wavelength of the hologram 11B remains at 0.5. As a result, as illustrated in the graph 65, in a case where the dominant wavelength is shifted by +6 nm from 528 nm to 534 nm, the display luminance ratio at the dominant wavelength is calculated by integrating the diffraction spectrum, the spectral radiant intensity of the LED, and the luminosity function, and is decreased from 0.5 to 0.13.

As described above, the CPU 31 makes it possible to decrease the display luminance ratio from 0.5 to 0.13 by decreasing from 140 mA to 50 mA. For example, assuming that the lower limit of the display luminance achievable by the PWM control is 6%, it is possible to decrease the display luminance to 6%×(0.13/0.5)=1.56% by such current value control. That is, in a case where the target display luminance is 1.56%, the CPU 31 decreases the current value from 140 mA to 50 mA, which makes it possible to achieve the target display luminance.

3. Second Embodiment

A second embodiment relates to the third point of the proposed technology. That is, the second embodiment is an embodiment in which feedback control is performed. The second embodiment is described in detail below with reference to FIGS. 10 to 12.

(1) Hardware Configuration Example

Figure 10:
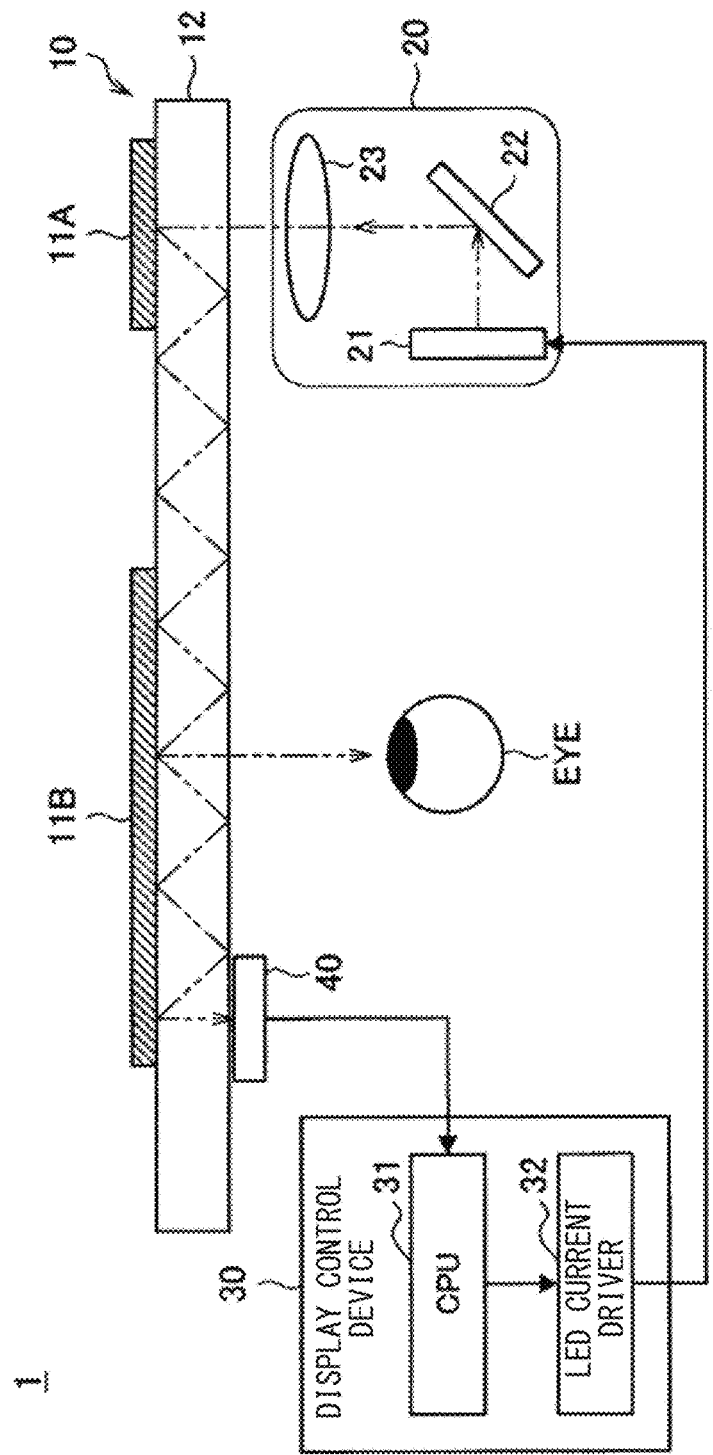
FIG. 10 is a diagram illustrating a hardware configuration example of a transmissive HMD according to a second embodiment.

FIG. 10 is a diagram illustrating a hardware configuration example of a transmissive HMD according to the present embodiment. As illustrated in FIG. 10, the transmissive HMD 1 according to the present embodiment includes a first optical sensor 40 in addition to the combiner 10, the optical engine 20, and the display control device 30. Basic configurations of the combiner 10, the optical engine 20, and the display control device 30 are as described above with reference to FIG. 2. The first optical sensor 40 is described below.

The first optical sensor 40 is a device that detects a first sensor value that is intensity of light (for example, image light) outputted from the combiner. The first optical sensor 40 detects intensity of light by any of systems such as a photoelectric effect type system or a thermal effect type system. The first optical sensor 40 outputs information indicating the detected first sensor value to the CPU 31.

The CPU 31 controls the display luminance further on the basis of the first sensor value detected by the first optical sensor 40. This point is described in detail with reference to FIG. 11.

(2) Display Luminance Control

Figure 11:
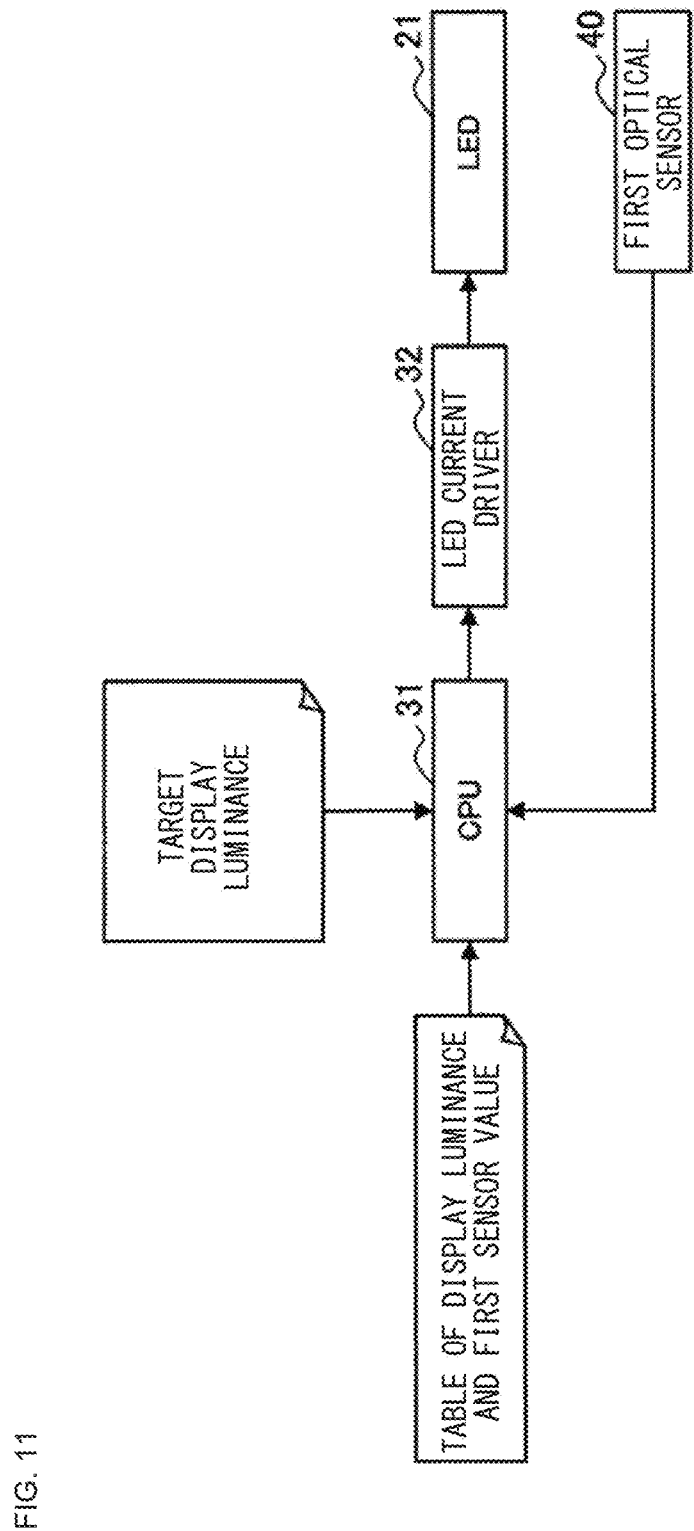
FIG. 11 is a diagram illustrating components and information involved in display luminance control by the transmissive HMD according to the same embodiment.

FIG. 11 is a graph illustrating components and information involved in display luminance control by the transmissive HMD 1 according to the present embodiment. As illustrated in FIG. 11, the CPU 31, the LED current driver 32, the LED 21, and the first optical sensor 40, as well as the target display luminance and a table of display luminance and the first sensor value are involved in the display luminance control according to the present embodiment.

The first optical sensor 40 outputs information indicating the detected first sensor value to the CPU 31.

The information indicating the first sensor value, the target display luminance, and the table of display luminance and the first sensor value are inputted to the CPU 31. The table of display luminance and the first sensor value is a table associating the display luminance with the first sensor value. Table 1 illustrates an example of the table of display luminance and the first sensor value.

[Table 1]

TABLE 1

Example of Table of Display Luminance and First Sensor Value

| Display Luminance | First Sensor Value |
|---|---|
| 6.0% | 100 |
| 5.4% | 90 |
| 4.5% | 75 |
| 3.0% | 50 |
| 1.5% | 25 |
| 1.0% | 17 |

The CPU 31 controls the light output of the LED 21 on the basis of the target display luminance and the first sensor value. Specifically, in a case where the target display luminance is less than the first threshold value, the CPU 31 performs the current value control to cause the display luminance corresponding to the first sensor value and the target display luminance to coincide with each other. Specifically, the CPU 31 determines whether or not the target display luminance and the first sensor value have a correspondence on the table of display luminance and the first sensor value. Here, having a correspondence means that the target display luminance and the first sensor value are provided in the same row on the table of display luminance and the first sensor value. In other words, having a correspondence means that the target display luminance and actual display luminance indicated by the first sensor value coincide with each other. In a case where the target display luminance and the actual display luminance indicated by the first sensor value do not coincide with each other, the CPU 31 performs the current value control to correct a difference between them.

For example, assuming that the first sensor value is 75, the CPU 31 refers to the table of display luminance and the first sensor value illustrated in the above Table 1, and recognizes that the actual display luminance is 4.5%. Assuming that the target display luminance is 3.0%, the CPU 31 then determines a current value for further decreasing the display luminance by 1.5%.

Even if the current value control is performed on the basis of the mathematical expression (1), variations in a peak wavelength of the diffraction efficiency of the combiner 10 or variations in the dominant wavelength of the LED 21 may cause a difference between the target display luminance and the actual display luminance. In this respect, performing feedback control makes it possible to reduce an influence of these circumstances on the display luminance and achieve the target display luminance more accurately.

(3) Flow of Processing

Figure 12:
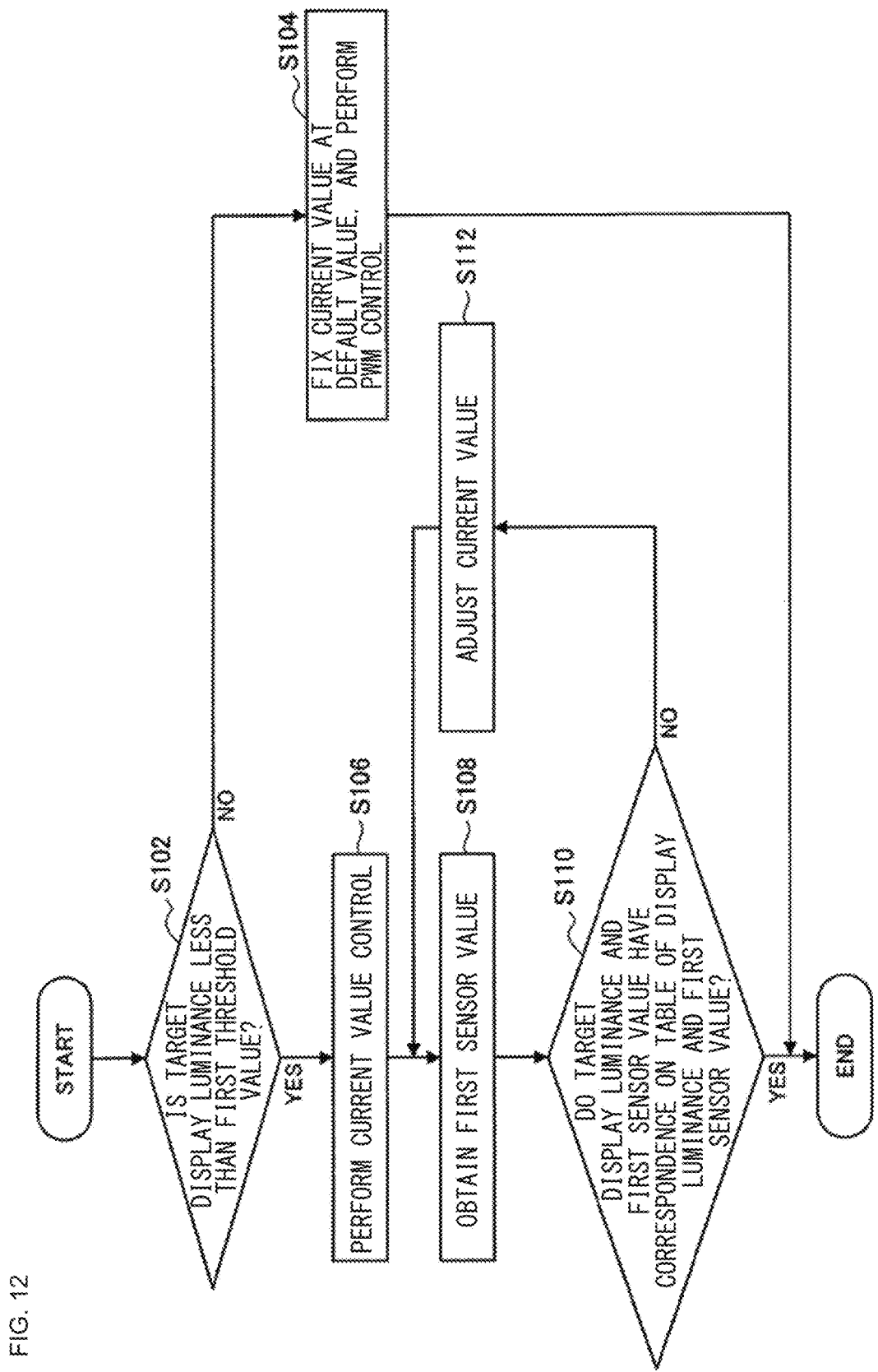
FIG. 12 is a flowchart illustrating an example of a flow of display luminance control processing to be executed by the transmissive HMD according to the same embodiment.

FIG. 12 is a flowchart illustrating an example of a flow of display luminance control processing to be executed by the transmissive HMD 1 according to the present embodiment. First, as illustrated in FIG. 12, the CPU 31 determines whether or not the target display luminance is less than the first threshold value (step S102). For example, in a case where the transmissive HMD 1 operates in an 8-bit grayscale representation at a frame rate of 60 fps and one field per frame, the CPU 31 determines whether or not the target display luminance is less than 6%. In a case where it is determined that the target display luminance is equal to or greater than the first threshold value (the step S102/NO), the LED current driver 32 fixes the current value at a default value (for example, 140 mA), and performs the PWM control (step S104). Thereafter, the processing ends.

Meanwhile, in a case where it is determined that the target display luminance is less than the first threshold value (the step S102/YES), the CPU 31 performs the current value control (step S106). For example, the CPU 31 determines a current value which makes it possible to achieve the target display luminance with use of the above-described mathematical expression (1). Next, the CPU 31 obtains the first sensor value detected by the first optical sensor 40 (step S108). Next, the CPU 31 determines whether or not the target display luminance and the first sensor value have a correspondence on the table of display luminance and the first sensor value (step S110). In a case where it is determined that they have no correspondence (the step S110/NO), the CPU 31 adjusts the current value (step S112). For example, the CPU 31 refers to the table of display luminance and the first sensor value, recognizes a difference between the target display luminance and the actual display luminance indicated by the first sensor value, and adjusts the current value to correct the recognized difference. Thereafter, the processing returns to the step S108 again. Meanwhile, in a case where it is determined that they have a correspondence (the step S110/YES), the processing ends.

4. Third Embodiment

A third embodiment relates to the fourth point of the proposed technology. That is, the third embodiment is an embodiment in which luminance control is performed on the basis of intensity of ambient light. The third embodiment is described in detail below with reference to FIGS. 13 to 17.

(1) Hardware Configuration Example

Figure 13:
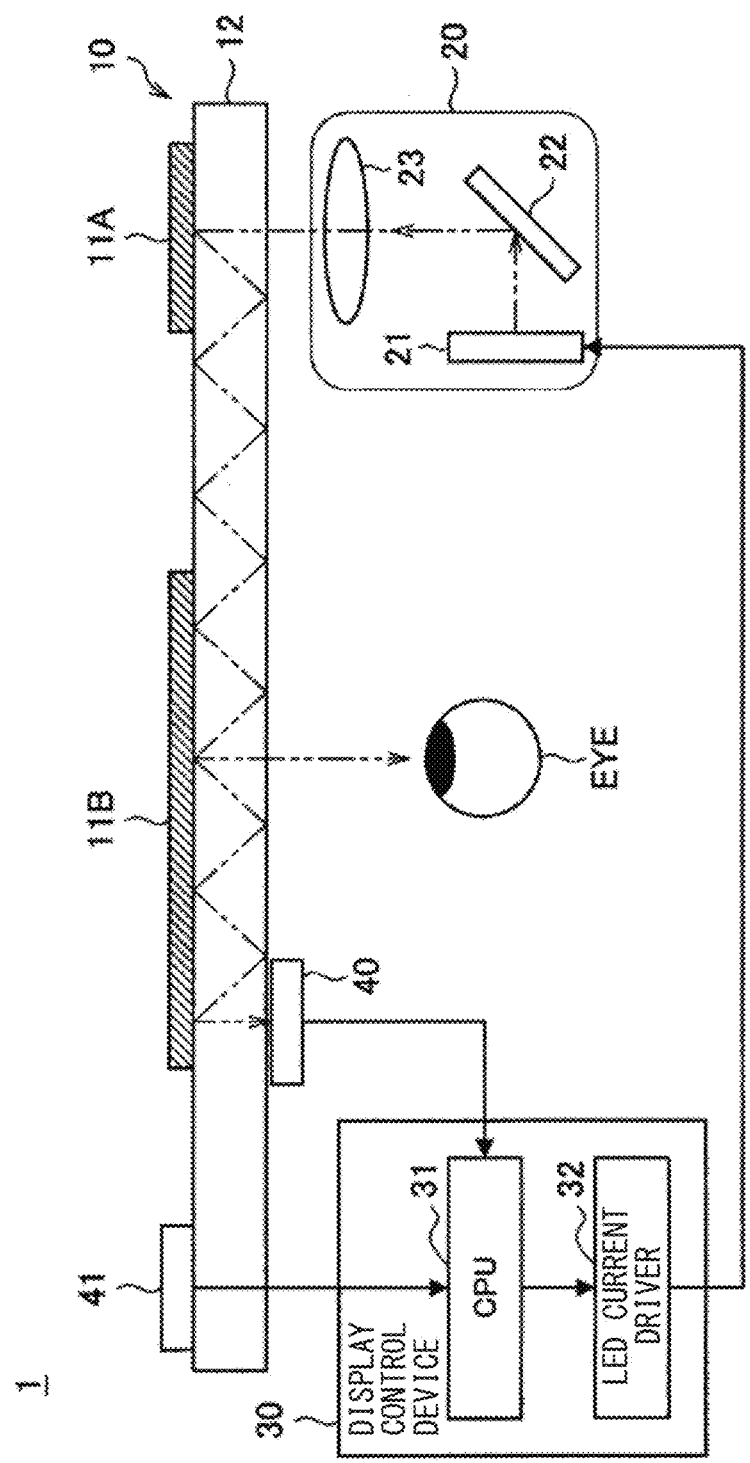
FIG. 13 is a diagram illustrating a hardware configuration example of a transmissive HMD according to a third embodiment.

FIG. 13 is a diagram illustrating a hardware configuration example of a transmissive HMD according to the present embodiment. As illustrated in FIG. 13, the transmissive HMD 1 according to the present embodiment includes a second optical sensor 41 in addition to the combiner 10, the optical engine 20, the display control device 30, and the first optical sensor 40. Basic configurations of the combiner 10, the optical engine 20, the display control device 30, and the first optical sensor 40 are as described above with reference to FIGS. 2 and 10. The second optical sensor 41 is described below.

The second optical sensor 41 is a device that detects a second sensor value indicating the intensity of the ambient light. The second optical sensor 41 detects intensity of light by any of systems such as a photoelectric effect type system or a thermal effect type system. The second optical sensor 41 outputs information indicating the detected second sensor value to the CPU 31.

The CPU 31 controls the display luminance further on the basis of the second sensor value detected by the second optical sensor 41. This point is described in detail with reference to FIGS. 14 to 16.

(2) Display Luminance Control

Figure 14:
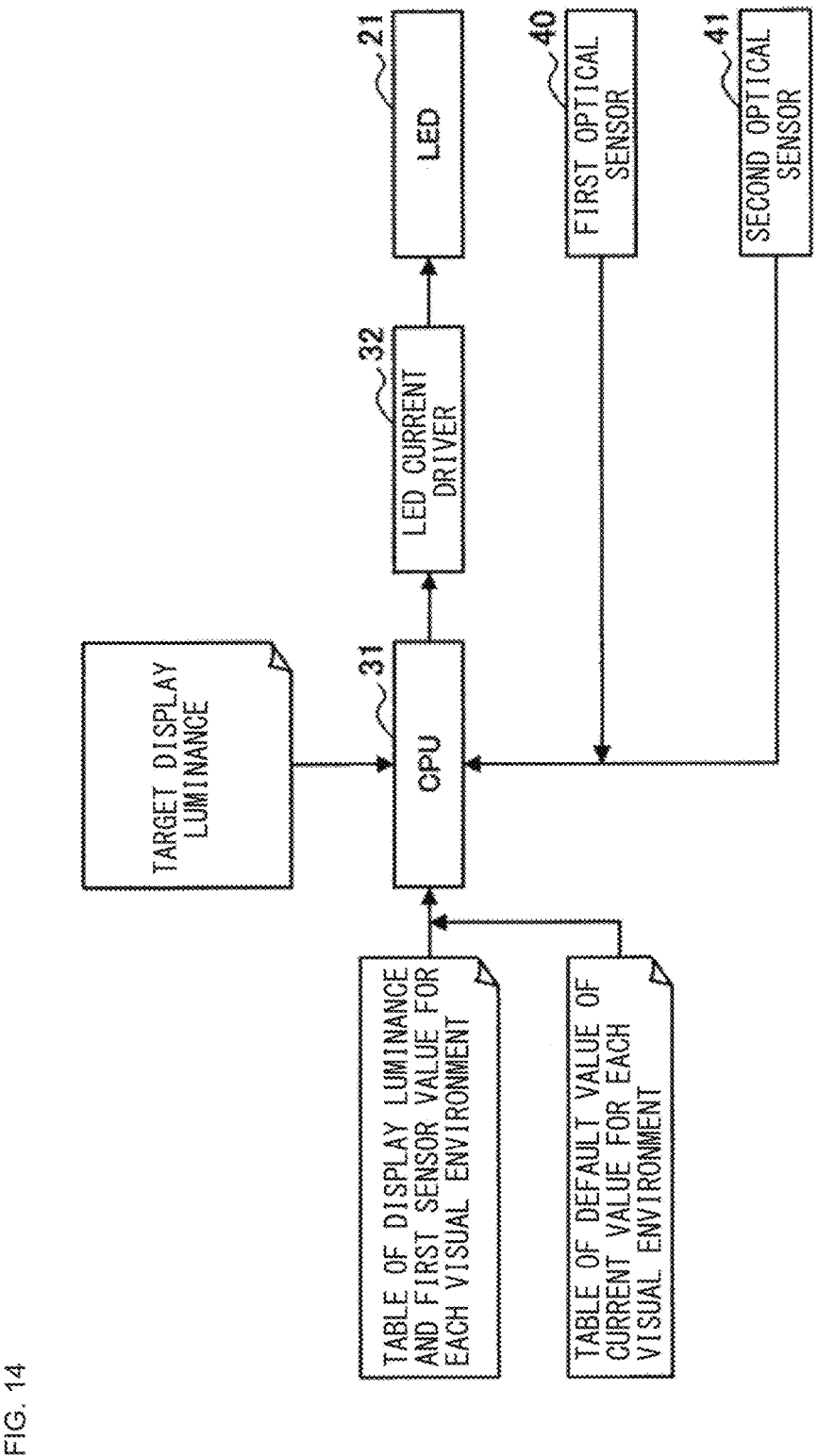
FIG. 14 is a diagram illustrating components and information involved in display luminance control by the transmissive HMD according to the same embodiment.

FIG. 14 is a diagram illustrating components and information involved in display luminance control by the transmissive HMD 1 according to the present embodiment. As illustrated in FIG. 14, the CPU 31, the LED current driver 32, the LED 21, the first optical sensor 40, and the second optical sensor 41 are involved in the display luminance control according to the present embodiment. In addition, target display luminance, a table of display luminance and the first sensor value for each visual environment, and a table of a default value of a current value for each visual environment are involved in the display luminance control according to the present embodiment.

The first optical sensor 40 outputs information indicating the detected first sensor value to the CPU 31.

The second optical sensor 41 outputs information indicating the detected second sensor value to the CPU 31.

The first sensor value, the second sensor value, the target display luminance, the table of display luminance and the first sensor value for each visual environment, the table of the default value of the current value for each visual environment are inputted to the CPU 31. The CPU 31 controls the light output of the LED 21 on the basis of these pieces of information. Specifically, the CPU 31 performs control with consideration given to luminosity function characteristics of a user on the basis of the second sensor value. The luminosity function characteristics of the user are described with reference to FIG. 15.

Figure 15:
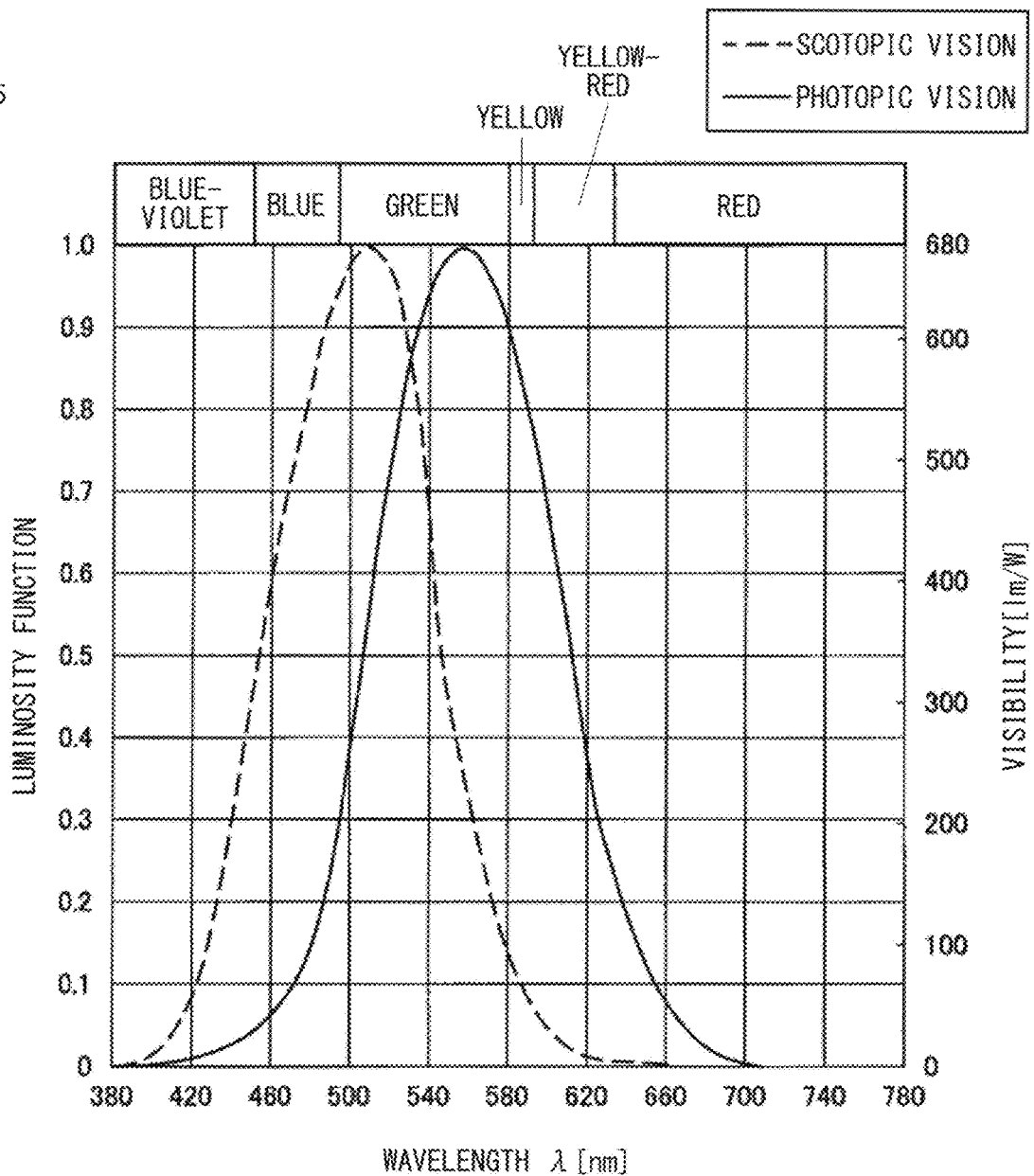
FIG. 15 is a graph illustrating an example of luminosity function characteristics of a user.

FIG. 15 is a graph illustrating an example of the luminosity function characteristics of the user. FIG. 15 illustrates a luminosity function/visibility for each of scotopic vision and photopic vision. The photopic vision is vision in an environment in which the intensity of the ambient light is equal to or greater than 1 cd/m^2. The scotopic vision is vision in an environment in which the intensity of the ambient light is less than 0.01 cd/m^2. In addition, mesopic vision is considered as an intermediate concept between the photopic vision and the scotopic vision. The mesopic vision is vision in an environment in which the intensity of the ambient light is equal to or greater than 0.01 cd/m^2 and less than 1 cd/m^2. The luminosity function characteristics for the mesopic vision are conceivable as characteristics obtained by averaging the luminosity function characteristics for the photopic vision and the luminosity function characteristics for the scotopic vision. As illustrated in FIG. 15, the luminosity function characteristics are changed depending on the intensity of the ambient light. In this respect, in the present embodiment, the display luminance is controlled on the basis of the second sensor value, which makes it possible to accurately achieve the target display luminance in any visual environment.

The table of the default value of the current value for each visual environment is a table holding a current value to be fixedly used upon the PWM control for each visual environment. It is to be noted that the visual environment is a generic name for various environments such as a photopic vision environment, a scotopic vision environment, and a mesopic vision environment. Table 2 illustrates an example of the table of the default value of the current value for each visual environment.

[Table 2]

TABLE 2

Table of Default Value of
Current Value for Each Visual Environment

| Photopic Vision | Scotopic Vision | Mesopic Vision |
| --- | --- | --- |
| 140 mA | 109 mA | 121 mA |

The table of display luminance and the first sensor value for each visual environment is a table associating the display luminance with the first sensor value in the visual environment indicated by the second sensor value. The display luminance here is a value calculated by the mathematical expression (1). Table 3 illustrates an example of the table of display luminance and the first sensor value for each visual environment.

[Table 3]

TABLE 3

Example of Table of Display Luminance and First Sensor
Value for Each Visual Environment

| | First Sensor Value | | |
| --- | --- | --- | --- |
| Display Luminance | Photopic Vision | Scotopic Vision | Mesopic Vision |
| 6.0% | 100 | 79 | 89 |
| 5.4% | 90 | 73 | 81 |
| 4.5% | 75 | 61 | 68 |
| 3.0% | 50 | 41 | 45 |
| 1.5% | 25 | 23 | 24 |
| 1.0% | 17 | 17 | 17 |

First, in a case where the target display luminance is equal to or greater than the first threshold value, the CPU 31 uses a current value corresponding to the second sensor value in the PWM control. For example, the CPU 31 performs the PWM control fixedly using a current value for photopic vision in an environment that is photopic vision indicated by the second sensor value. Similarly, the CPU 31 performs the PWM control fixedly using a current value for scotopic vision in an environment that is scotopic vision indicated by the second sensor value, and a current value for mesopic vision in an environment that is mesopic vision indicated by the second sensor value. Here, it is desirable to set the current values to be used for the PWM control in respective environments to cause the lower limit of display luminance achievable in the PWM control to become the same in the respective environments. In this case, it is possible to equalize dynamic ranges of the display luminance in the PWM control in the respective environments having different intensities of ambient light.

Specifically, the CPU 31 determines a default current value corresponding to an environment indicated by the second sensor value with reference to the table of the default value of the current value for each visual environment. For example, the CPU 31 refers to the table of the default value of the current value for each visual environment illustrated in the above Table 2, and supplies 140 mA to the LED 21 upon the PWM control in an environment that is indicated to be photopic vision. Similarly, the CPU 31 supplies 109 mA to the LED 21 upon the PWM control in an environment that is indicated to be scotopic vision, and supplies 121 mA to the LED 21 upon the PWM control in an environment that is indicated to be mesopic vision.

In addition, in a case where the target display luminance is less than the first threshold value, the CPU 31 performs the current value control to cause display luminance corresponding to the first sensor value and the second sensor value, and the target display luminance to coincide with each other. Specifically, the CPU 31 determines whether or not the target display luminance and the first sensor value in an environment indicated by the second sensor value have a correspondence on the table of display luminance and the first sensor value for each visual environment. Here, having a correspondence means the target display luminance and the first sensor value in the environment indicated by the second sensor value are provided in the same row on the table of display luminance and the first sensor value for each visual environment. In other words, having a correspondence means that the target display luminance and actual display luminance indicated by the first sensor value in the environment indicated by the second sensor value coincide with each other. In a case where the target display luminance and the actual display luminance indicated by the first sensor value in the environment indicated by the second sensor value do not coincide with each other, the CPU 31 performs the current value control to correct a difference between them.

For example, it is assumed that the first sensor value is 61 in an environment that is scotopic vision indicated by the second sensor value. In this case, the CPU 31 refers to the table of display luminance and the first sensor value for each visual environment illustrated in the above Table 3, and recognizes that actual display luminance in the corresponding environment is 4.5%. In a case where the target display luminance is 3.0%, the CPU 31 then determines a current value for further decreasing the display luminance by 1.5%.

Figure 16:
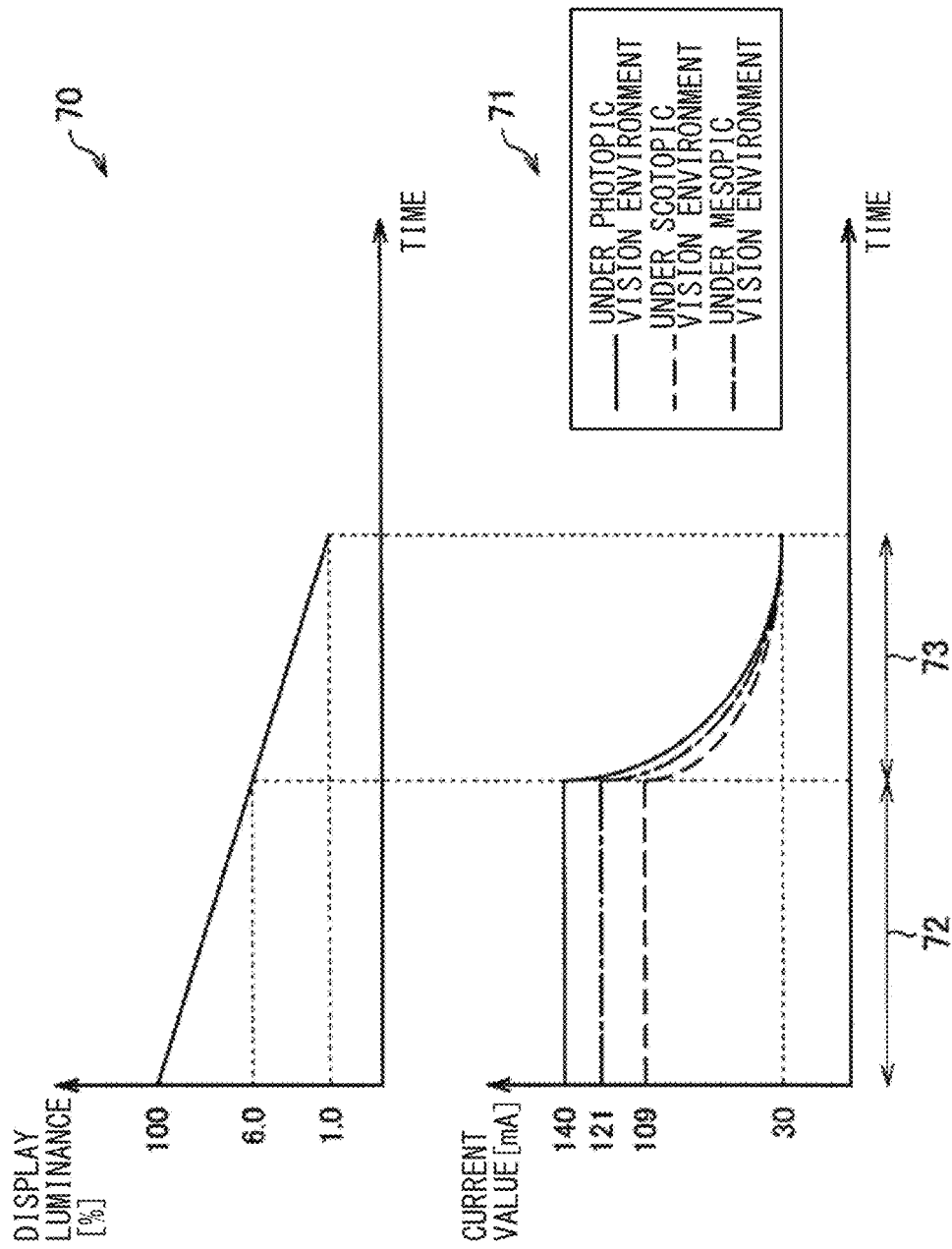
FIG. 16 is a graph illustrating a state of display luminance control in each visual environment by the transmissive HMD according to the same embodiment.

Description is given, with reference to FIG. 16, of a relationship between the display luminance and the current value in each visual environment in a case where control of the display luminance described above is performed.

FIG. 16 is a graph illustrating a state of display luminance control in each visual environment by the transmissive HMD 1 according to the present embodiment. A graph 70 is a graph indicating time-series change in display luminance achieved as a result of front luminance control executed in each visual environment by the transmissive HMD 1. In the graph 70, a horizontal axis indicates time, and a vertical axis indicates display luminance. A graph 71 is a graph indicating time-series change in a current value supplied to the LED 21 to achieve the time-series change in display luminance illustrated in the graph 70. In the graph 70, a horizontal axis indicates time, and a vertical axis indicates the current value. As illustrated in the graph 70, in any of the visual environments, the display luminance is linearly decreased from 100% to 1% similarly. As illustrated in the graph 71, in a PWM control zone 72, current values different for the respective visual environments are fixedly used. In addition, as illustrated in the graph 71, in a current value control zone 73, the current value is nonlinearly decreased by a reduction width corresponding to each of the visual environments for decreasing the display luminance. As can be seen from the graphs 70 and 71, even if the same current value is supplied to the LED 21, in a bright visual environment, the display luminance is relatively decreased, as compared with in a dark visual environment. Accordingly, the CPU 31 increases the current value in the bright visual environment, as compared with in the dark visual environment, and decreases the current value in the dark visual environment, as compared with in the bright visual environment.

As described above, performing control of the display luminance on the basis of the intensity of the ambient light makes it possible to accurately achieve the target display luminance in any visual environment.

(3) Flow of Processing

Figure 17:
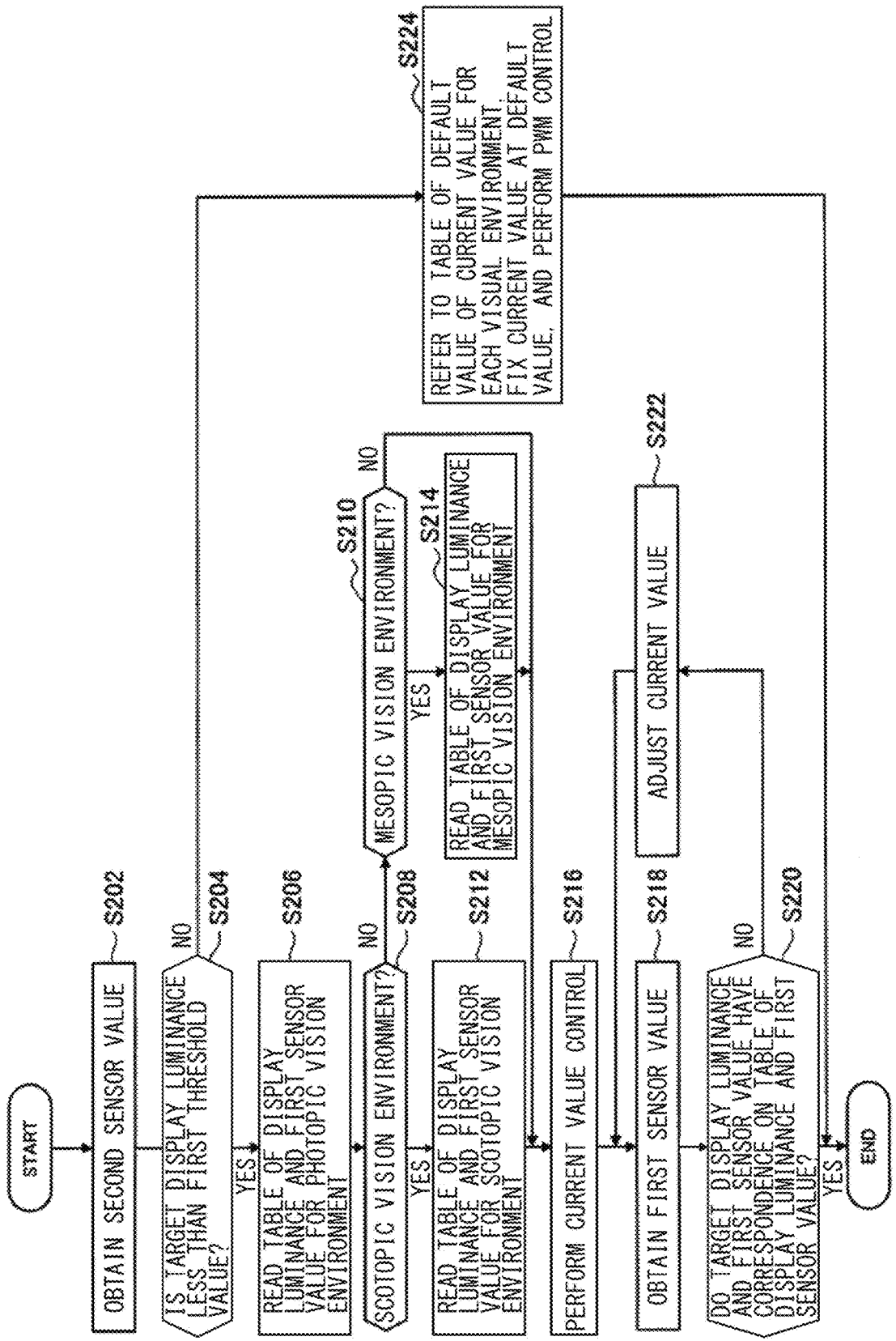
FIG. 17 is a flowchart illustrating an example of a flow of display luminance control processing to be executed by the transmissive HMD according to the same embodiment.

FIG. 17 is a flowchart illustrating an example of a flow of display luminance control processing to be executed by the transmissive HMD 1 according to the present embodiment. First, as illustrated in FIG. 17, the CPU 31 obtains the second sensor value detected by the second optical sensor 41 (step S202). Next, the CPU 31 determines whether or not the target display luminance is less than the first threshold value (step S204). For example, in a case where the transmissive HMD 1 operates in an 8-bit gray-scale representation at a frame rate of 60 fps and one field per frame, the CPU 31 determines whether or not the target display luminance is less than 6%. In a case where it is determined that the target display luminance is equal to or greater than the first threshold value (step S204/NO), the LED current driver 32 refers to the table of the default value of the current value for each visual environment, fixes the current value at the default value, and performs the PWM control (step S224). For example, the LED current driver 32 fixes the current value at 140 mA in the photopic vision environment, 109 mA in the scotopic vision environment, and 121 mA in the mesopic vision environment, and performs the PWM control. Thereafter, the processing ends.

Meanwhile, in a case where it is determined that the target display luminance is less than the first threshold value (the step S204/YES), the CPU 31 reads the table of display luminance and the first sensor value for the photopic vision environment (step S206). Next, the CPU 31 determines whether or not the environment is the scotopic vision environment on the basis of the second sensor value (step S208). In a case where it is determined that the environment is the scotopic vision environment (the step S208/YES), the CPU 31 reads (that is, rereads) the table of display luminance and the first sensor value for the scotopic vision environment (S212). Thereafter, the processing proceeds to step S216. In a case where it is determined that the environment is not the scotopic vision environment (the step S208/NO), the CPU 31 determines whether or not the environment is the mesopic vision environment on the basis of the second sensor value (step S210). In a case where it is determined that the environment is the mesopic vision environment (the step S210/YES), the CPU 31 reads (that is, rereads) the table of display luminance and the first sensor value for the mesopic vision environment (S214). Thereafter, the processing proceeds to step S216. In a case where it is determined that the environment is not the mesopic vision environment (the step S210/NO), the processing proceeds to the step S216.

In the step S216, the CPU 31 performs the current value control. For example, the CPU 31 determines a current value which makes it possible to achieve the target display luminance with use of the above-described mathematical expression (1). Next, the CPU 31 obtains the first sensor value detected by the first optical sensor 40 (step S218). Next, the CPU 31 determines whether or not the target display luminance and the first sensor value have a correspondence on the table of display luminance and the first sensor value read in the step S206, S212, or S214 described above (step S220). In a case where it is determined that they have no correspondence (the step S220/NO), the CPU 31 adjusts the current value (step S222). For example, the CPU 31 refers to the table of display luminance and the first sensor value read in the step S206, S212, or S214 described above, recognizes a difference between the target display luminance and the actual display luminance indicated by the first sensor value, and adjusts the current value to correct the recognized difference. Thereafter, the processing returns to the step S218 again. Meanwhile, in a case where it is determined that they have a correspondence (the step S220/YES), the processing ends.

5. Fourth Embodiment

A fourth embodiment relates to the fifth point of the proposed technology. That is, the fourth embodiment is an embodiment in which luminance control is performed with use of light sources of a plurality of colors. The fourth embodiment is described in detail below with reference to FIGS. 18 to 24.

(1) Hardware Configuration Example

Figure 18:
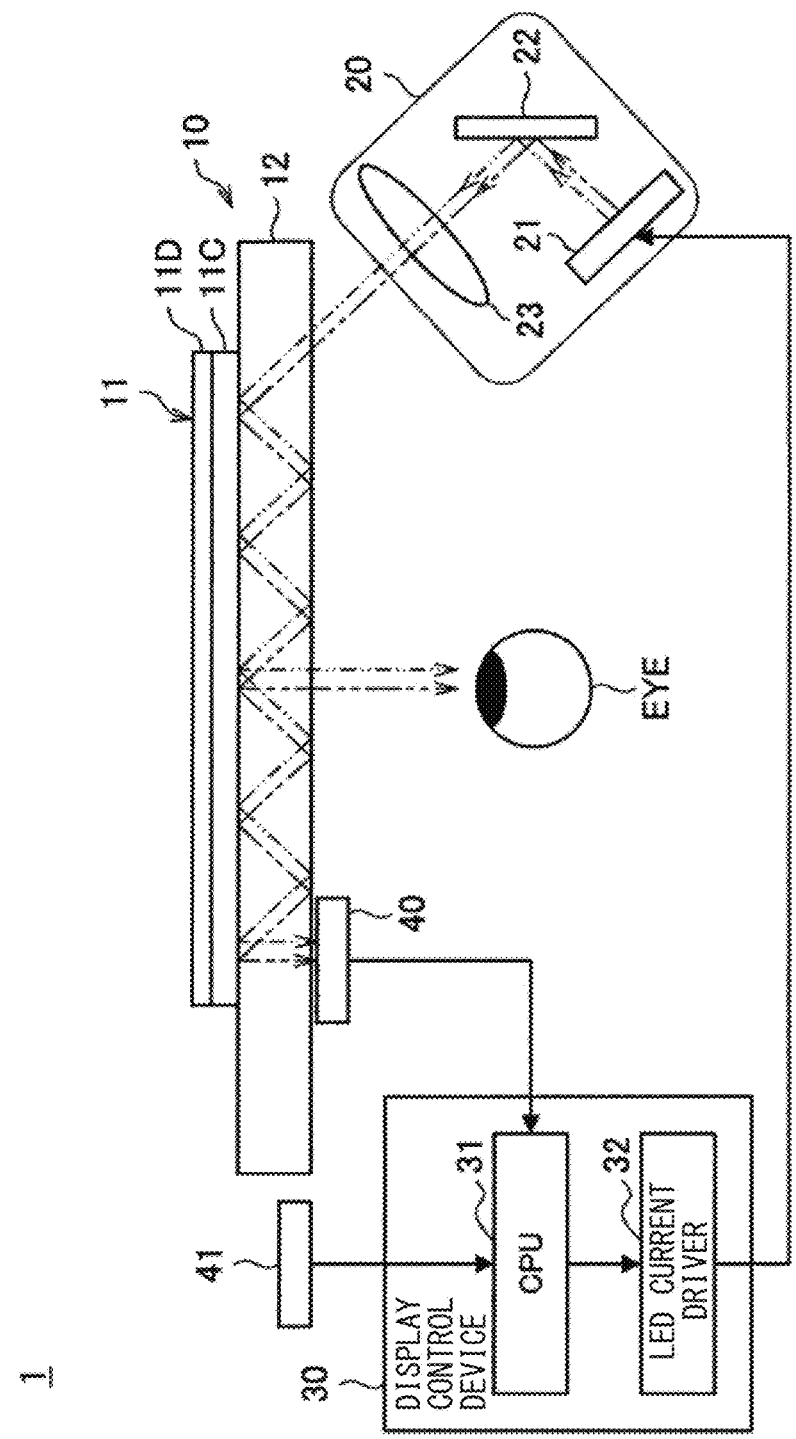
FIG. 18 is a diagram illustrating a hardware configuration example of a transmissive HMD according to a fourth embodiment.

FIG. 18 is a diagram illustrating a hardware configuration example of a transmissive HMD according to the present embodiment. As illustrated in FIG. 18, the transmissive HMD 1 according to the present embodiment includes the combiner 10, the optical engine 20, the display control device 30, the first optical sensor 40, and the second optical sensor 41. Configurations of the display control device 30, the first optical sensor 40, and the second optical sensor 41 are as described above with reference to FIGS. 2, 10, and 13. The combiner 10 and the optical engine 20 are described below.

Optical Engine 20

The LED 21 according to the present embodiment emits at least one of light of a first color or light of a second color. The second color is a color having a wavelength longer than the first color. For example, the first color is green, and the second color is amber. The LED 21 may include a green LED that emits green light and an amber LED that emits amber light. The LED 21 generates and emits green light, amber light, or both green light and amber light.

The MEMS mirror 22 and the lens 23 are as described above with reference to FIG. 2.

Combiner 10

The hologram 11 according to the present embodiment includes a hologram 11C that diffracts green light and a hologram 11D that diffracts amber light.

The transparent plate 12 is as described above with reference to FIG. 2.

(2) Display Luminance Control

Figure 19:
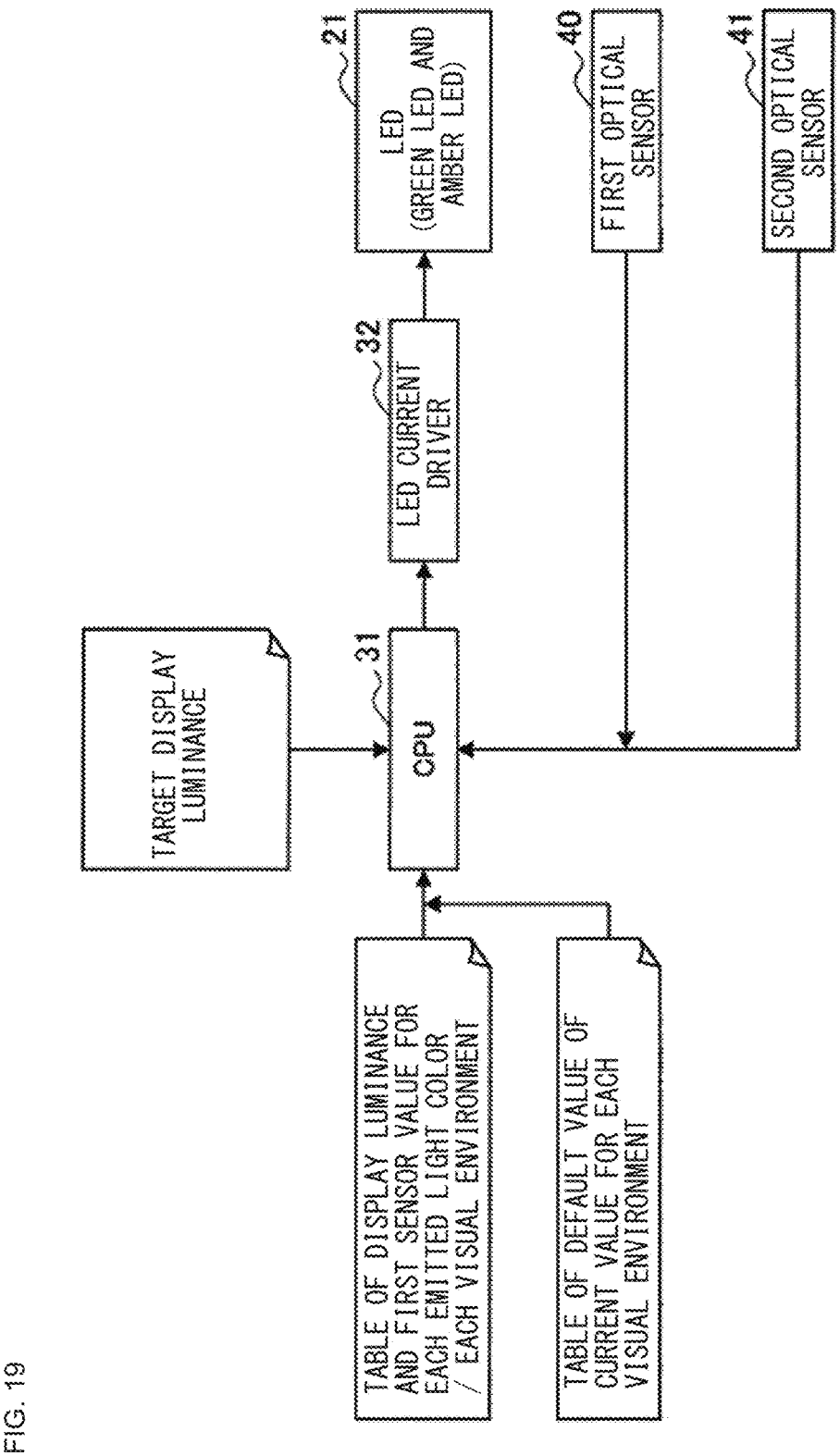
FIG. 19 is a diagram illustrating components and information involved in display luminance control by the transmissive HMD according to the same embodiment.

FIG. 19 is a diagram illustrating components and information involved in display luminance control by the transmissive HMD 1 according to the present embodiment. As illustrated in FIG. 19, the CPU 31, the LED current driver 32, the LED 21 (the green LED and the amber LED), the first optical sensor 40, and the second optical sensor 41 are involved in the display luminance control according to the present embodiment. In addition, target display luminance, and a table of display luminance and the first sensor value corresponding to an emitted light color and the second current value are involved in the display luminance control according to the present embodiment.

The first optical sensor 40 outputs information indicating the detected first sensor value to the CPU 31.

The second optical sensor 41 outputs information indicating the detected second sensor value to the CPU 31.

The first sensor value, the second sensor value, the target display luminance, a table of display luminance and the first sensor value for each emitted light color/each visual environment, the table of the default value of the current value for each visual environment are inputted to the CPU 31. The CPU 31 controls the light output of the LED 21 on the basis of these pieces of information.

The table of display luminance and the first sensor value for each emitted light color/each visual environment is a table that is defined for each emitted light color and is illustrated in Table 3 as an example. In a case where green light is emitted, the CPU 31 controls the current value with reference to the table of display luminance and the first sensor value for each visual environment in a case where the emitted light color is green. In addition, in a case where amber light is emitted, the CPU 31 controls the current value with reference to the table of display luminance and the first sensor value for each visual environment in a case where the emitted light color is amber. In addition, in a case where both green light and amber light are emitted, the CPU 31 controls the current value with reference to the table of display luminance and the first sensor value for each visual environment in a case where the emitted light color includes both green and amber. A specific control method is as described above in the third embodiment.

The CPU 31 controls the emitted light color of the LED 21 in accordance with the target display luminance. The CPU 31 controls a method of using green light and amber light in combination in accordance with the target display luminance. For example, the CPU 31 causes stronger amber light to be emitted in a case where the target display luminance is lower. With reference to a graph of luminosity function characteristics illustrated in FIG. 15, amber has a lower luminosity function than green. Accordingly, decreasing a ratio of green light and increasing a ratio of amber light makes it possible to further decrease the display luminance. An example of the method of using green light and amber light in combination is described with reference to FIG. 20.

Figure 20:
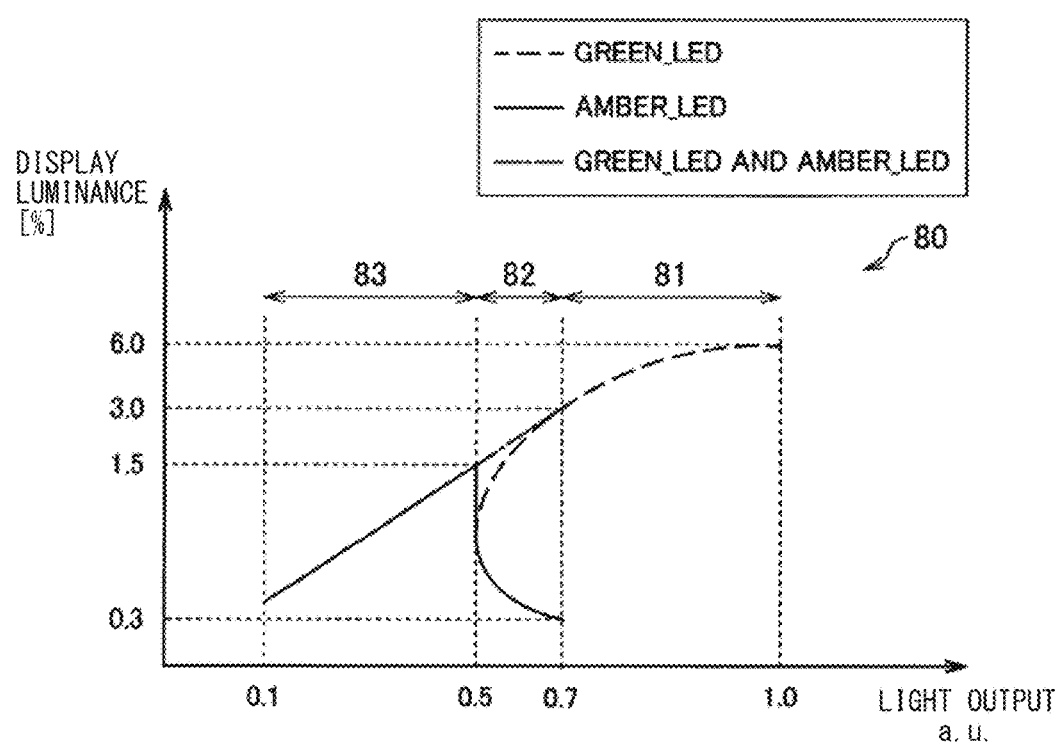
FIG. 20 is an explanatory graph of an example of a method of using green light and amber light in combination by the transmissive HMD according to the same embodiment.

FIG. 20 is an explanatory graph of an example of the method of using green light and amber light in combination by the transmissive HMD 1 according to the present embodiment. In a graph 80, a horizontal axis indicates a light output with use of a light output at a default current value as a reference, and a vertical axis indicates display luminance. In the graph 80, a lower limit of display luminance achievable by the PWM control is 6%. The CPU 31 causes green light to be emitted in a case where the target display luminance is equal to or greater than 3.0% (corresponding to a second threshold value). The CPU 31 decreases the target luminance and decreases a current value to be supplied to the green LED in a zone 81 to decrease the light output, which achieves a decrease in the display luminance. In addition, in a case where the target display luminance is equal to or greater than 1.5% (corresponding to a third threshold value) and less than 3.0% (corresponding to the second threshold value), the CPU 31 causes both green light and amber light to be emitted. In a zone 82, the CPU 31 controls a current value to be supplied to the green LED and a current value to be supplied to the amber LED to cause display luminance achieved by the sum of the light output of the green LED and the light output of the amber LED to be linearly changed. Specifically, the CPU 31 gradually decreases the current value to be supplied to the green LED to gradually decrease a green light output, and gradually increases the current value to be supplied to the amber LED to gradually increase an amber light output. In addition, the CPU 31 causes amber light to be emitted in a case where the target display luminance is less than 1.5% (corresponding to the third threshold value). In a zone 83, the CPU 31 decreases the target display luminance and decreases the current value to be supplied to the amber LED to decrease the light output, which achieves a decrease in the display luminance. It is to be noted that in the zone 83, a peak wavelength of the amber LED is hardly shifted; therefore, there is little influence of a decrease in diffraction efficiency by the combiner 10. Accordingly, the display luminance and the light output are linearly changed. Gradually changing the emitted light color to monochromatic green, then to a mixed color of green and amber, and then to monochromatic amber in such a manner makes it possible for the user to hardly perceive change in a displayed color.

The CPU 31 may control the emitted light color of the LED 21 in accordance with the second sensor value. For example, the CPU 31 causes green light to be emitted in the photopic vision environment, and causes amber light to be emitted in the scotopic vision environment. In a dark visual environment, visibility characteristics are shifted to a short wavelength side. Accordingly, using amber light in the dark visual environment makes it possible to further decrease the display luminance.

(3) Flow of Processing

Display luminance control processing according to the present embodiment is described below with reference to FIGS. 21 to 24.

Figure 21:
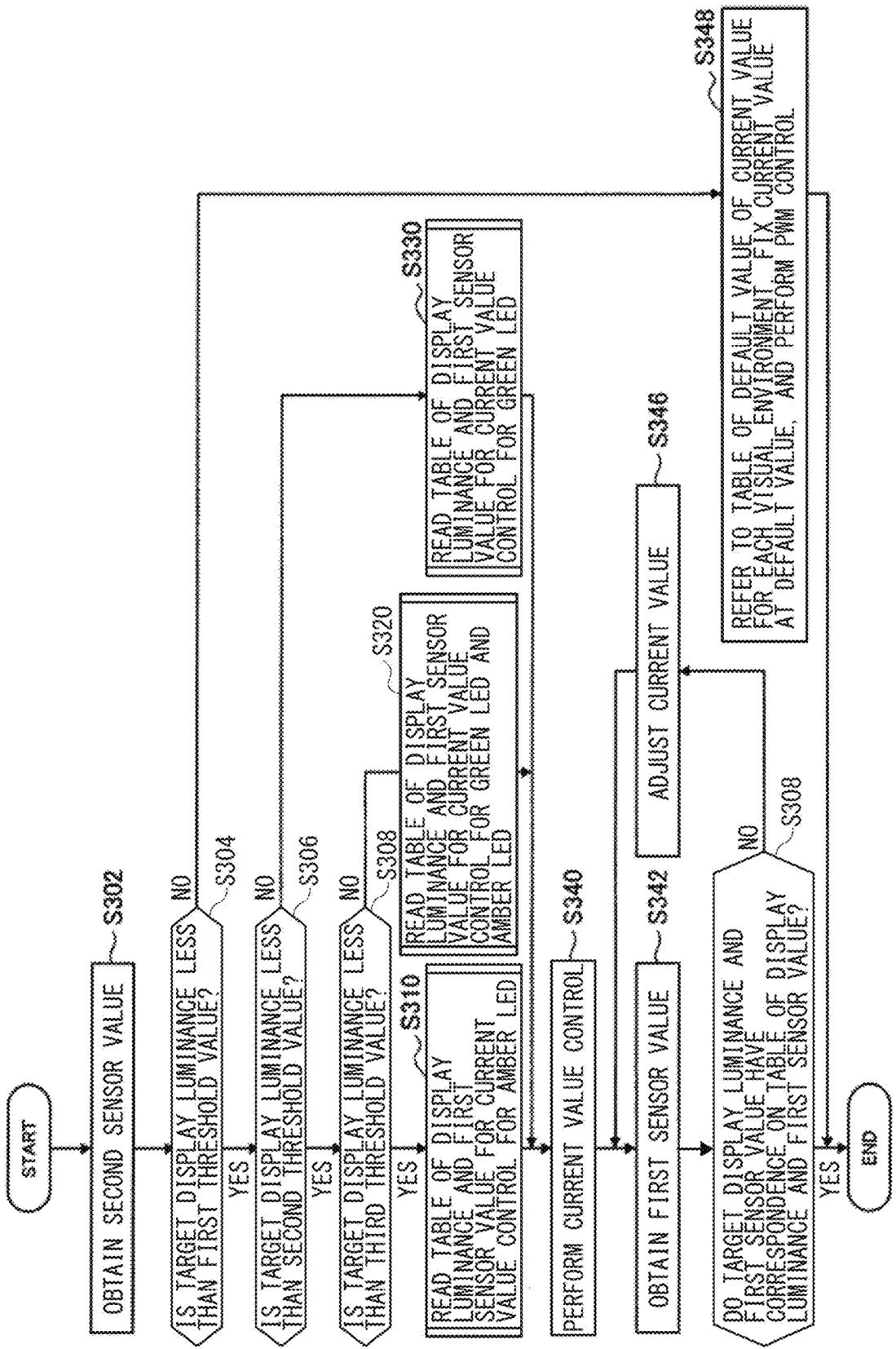
FIG. 21 is a flowchart illustrating an example of a flow of display luminance control processing to be executed by the transmissive HMD according to the same embodiment.

FIG. 21 is a flowchart illustrating an example of a flow of the display luminance control processing to be executed by the transmissive HMD 1 according to the present embodiment. First, as illustrated in FIG. 21, the CPU 31 obtains the second sensor value detected by the second optical sensor 41 (step S302). Next, the CPU 31 determines whether or not the target display luminance is less than the first threshold value (step S304). For example, in a case where the transmissive HMD 1 operates in an 8-bit gray-scale representation at a frame rate of 60 fps and one field per frame, the CPU 31 determines whether or not the target display luminance is less than 6%. In a case where it is determined that the target display luminance is equal to or greater than the first threshold value (the step S304/NO), the LED current driver 32 refers to the table of the default value of the current value for each visual environment, fixes a current value at the default value, and performs the PWM control (step S348). For example, the LED current driver 32 fixes the current value at 140 mA in the photopic vision environment, 109 mA in the scotopic vision environment, and 121 mA in the mesopic vision environment, and performs the PWM control. At this time, the LED current driver 32 causes the green LED to emit light. Thereafter, the processing ends.

Meanwhile, in a case where it is determined that the target display luminance is less than the first threshold value (the step S304/YES), the CPU 31 determines whether or not the target display luminance is less than the second threshold value (step S306). In an example illustrated in FIG. 20, the CPU 31 determines whether or not the target display luminance is less than 3.0%. In a case where it is determined that the target display luminance is equal to or greater than the first threshold value (the step S306/NO), the CPU 31 reads the table of display luminance and the first sensor value for current value control for the green LED (step S330). Details of processing in this step are described with reference to FIG. 24. Thereafter, the processing proceeds to step S340.

In a case where it is determined that the target display luminance is less than the second threshold value (step S306/YES), the CPU 31 determines whether or not the target display luminance is less than the third threshold value (step S308). In an example illustrated in FIG. 20, the CPU 31 determines whether or not the target display luminance is less than 1.5%. In a case where it is determined that the target display luminance is equal to or greater than the second threshold value (step S308/NO), the CPU 31 reads the table of display luminance and the first sensor value for the current value control for the green LED and the amber LED (step S320). Details of processing in this step are described with reference to FIG. 23. Thereafter, the processing proceeds to step S340.

In a case where it is determined that the target display luminance is less than the third threshold value (the step S308/YES), the CPU 31 reads the table of display luminance and the first sensor value for the current value control for the amber LED (step S310). Details of processing in this step are described with reference to FIG. 22. Thereafter, the processing proceeds to step S340.

In the step S340, the CPU 31 performs the current value control. For example, the CPU 31 determines a current value which makes it possible to achieve the target display luminance with use of the above-described mathematical expression (1). Next, the CPU 31 obtains the first sensor value detected by the first optical sensor 40 (step S342). Next, the CPU 31 determines whether or not the target display luminance and the first sensor value have a correspondence on the table of display luminance and the first sensor value read in the step S310, S320, or S330 described above (step S344). In a case where it is determined that they have no correspondence (the step S344/NO), the CPU 31 adjusts the current value (step S346). For example, the CPU 31 refers to the table of display luminance and the first sensor value read in the step S310, S320, or S330 described above, recognizes a difference between the target display luminance and actual display luminance indicated by the first sensor value, and adjusts the current value to correct the recognized difference. Thereafter, the processing returns to the step S342 again. Meanwhile, in a case where it is determined that they have a correspondence (the step S344/YES), the processing ends.

Details of Processing in Step S310

Figure 22:
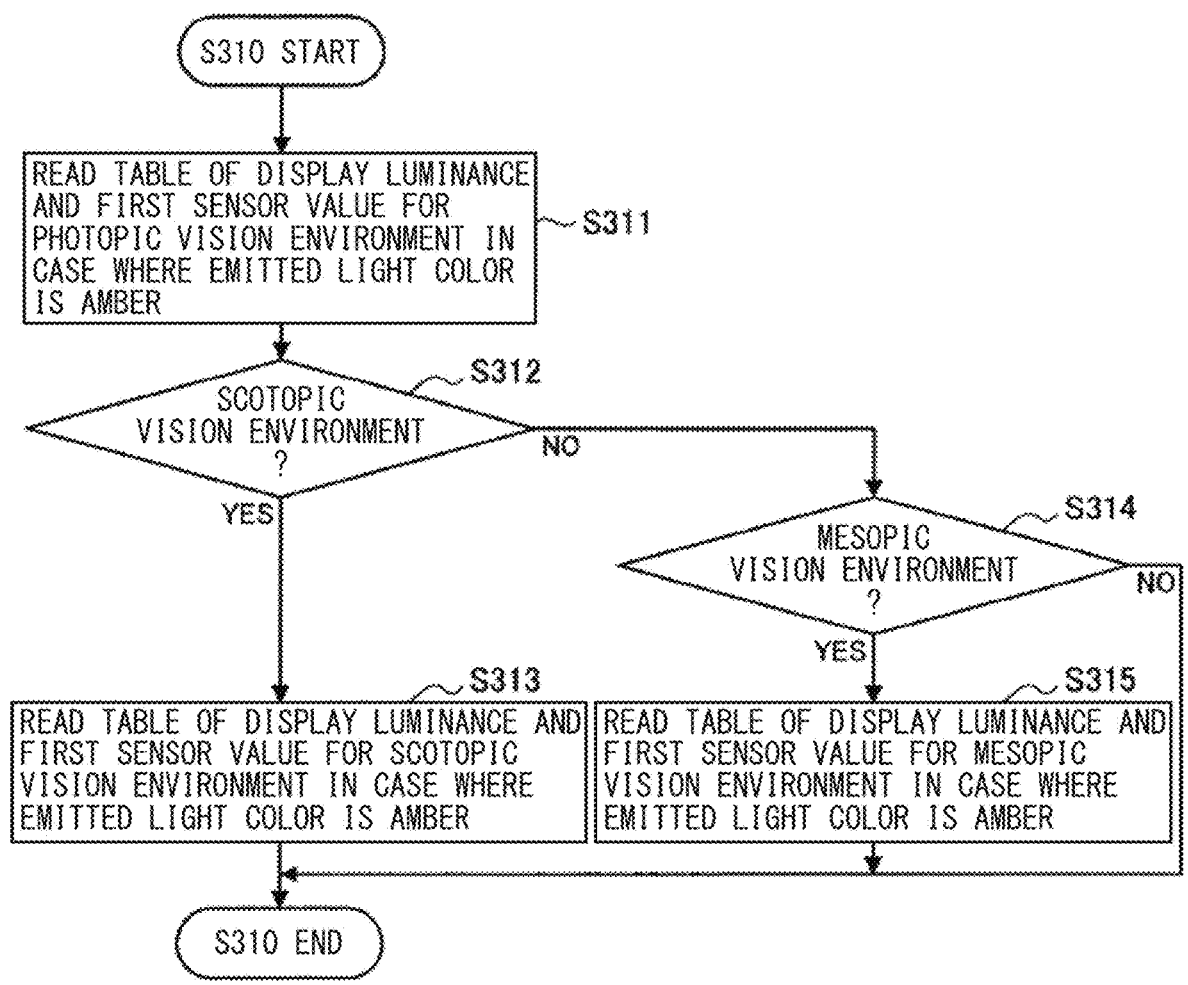
FIG. 22 is a flowchart illustrating an example of a detailed processing flow in step S310 in the flowchart illustrated in FIG. 21.

FIG. 22 is a flowchart illustrating an example of a flow of detailed processing in the step S310 in the flowchart illustrated in FIG. 21. As illustrated in FIG. 22, first, the table of display luminance and the first sensor value for photopic vision environment in a case where the emitted light color is amber is read (step S311). Next, the CPU 31 determines whether or not the environment is the scotopic vision environment on the basis of the second sensor value (step S312). In a case where it is determined that the environment is the scotopic vision environment (the step S312/YES), the CPU 31 reads (that is, rereads) the table of display luminance and the first sensor value for the scotopic vision environment in a case where the emitted light color is amber (S313). Thereafter, the processing ends. In a case where it is determined that the environment is not the scotopic vision environment (the step S312/NO), the CPU 31 determines whether or not the environment is the mesopic vision environment on the basis of the second sensor value (step S314). In a case where it is determined that the environment is the mesopic vision environment (the step S314/YES), the CPU 31 reads (that is, rereads) the table of display luminance and the first sensor value for the mesopic vision environment in a case where the emitted light color is amber (S315). Thereafter, the processing ends. In a case where it is determined that the environment is not the mesopic vision environment (the step S314/NO), the processing ends.

Details of Processing in Step S320

Figure 23:
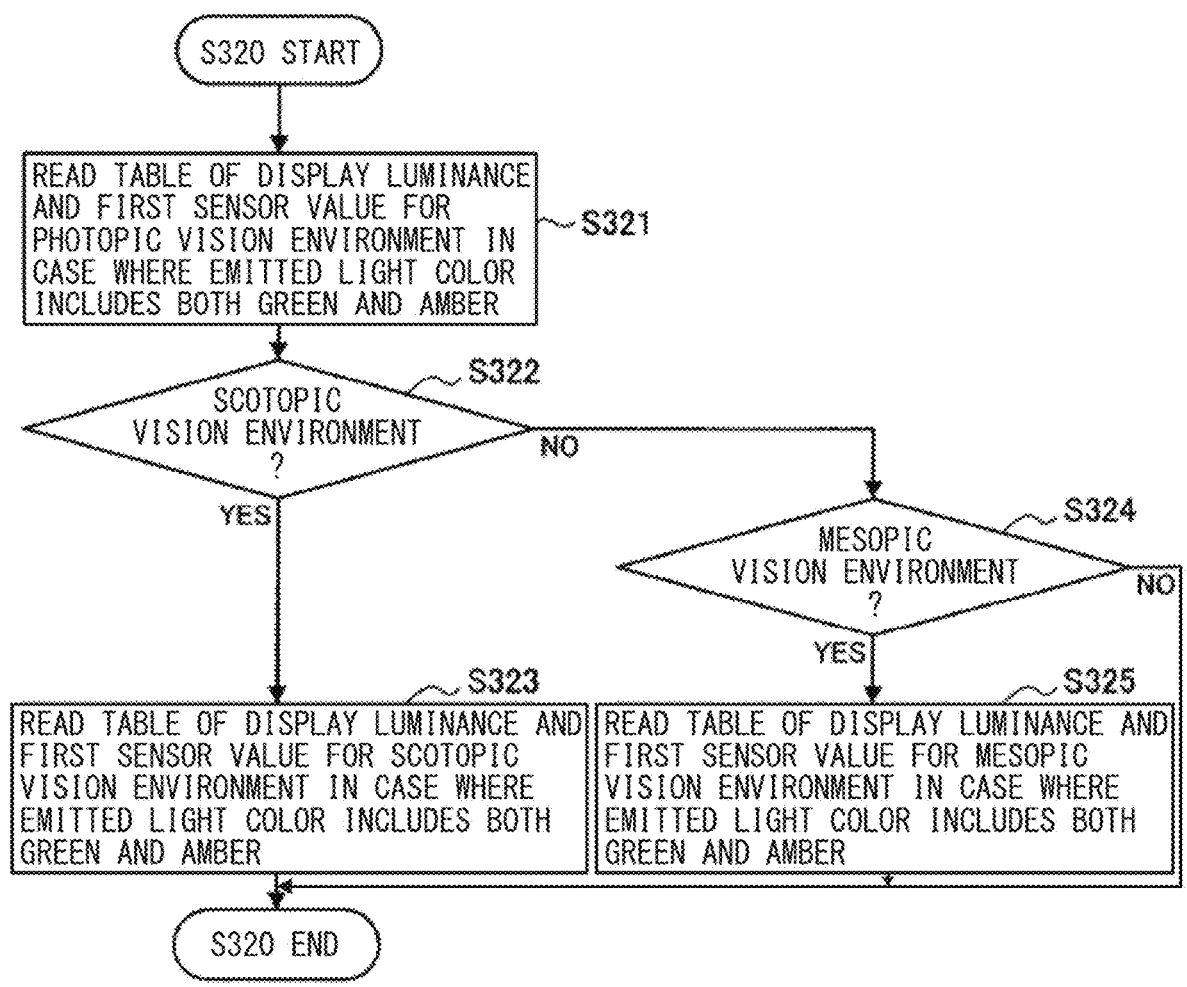
FIG. 23 is a flowchart illustrating an example of a detailed processing flow in step S320 in the flowchart illustrated in FIG. 21.

FIG. 23 is a flowchart illustrating an example of a flow of detailed processing in the step S320 in the flowchart illustrated in FIG. 21. As illustrated in FIG. 23, first, the table of display luminance and the first sensor value for the photopic vision environment in a case where emitted light color includes both green and amber is read (step S321). Next, the CPU 31 determines whether or not the environment is the scotopic vision environment on the basis of the second sensor value (step S322). In a case where it is determined that the environment is the scotopic vision environment (the step S322/YES), the CPU 31 reads (rereads) the table of display luminance and the first sensor value for the scotopic vision environment in a case where the emitted light color includes both green and amber (S323). Thereafter, the processing ends. In a case where it is determined that the environment is not the scotopic vision environment (the step S322/NO), the CPU 31 determines whether or not the environment is the mesopic vision environment on the basis of the second sensor value (step S324). In a case where it is determined that the environment is the mesopic vision environment (the step S324/YES), the CPU 31 reads (that is, rereads) the table of display luminance and the first sensor value for the mesopic vision environment in a case where the emitted light color includes both green and amber (S325). Thereafter, the processing ends. In a case where it is determined that the environment is not the mesopic vision environment (the step S324/NO), the processing ends.

Details of Processing in Step S330

Figure 24:
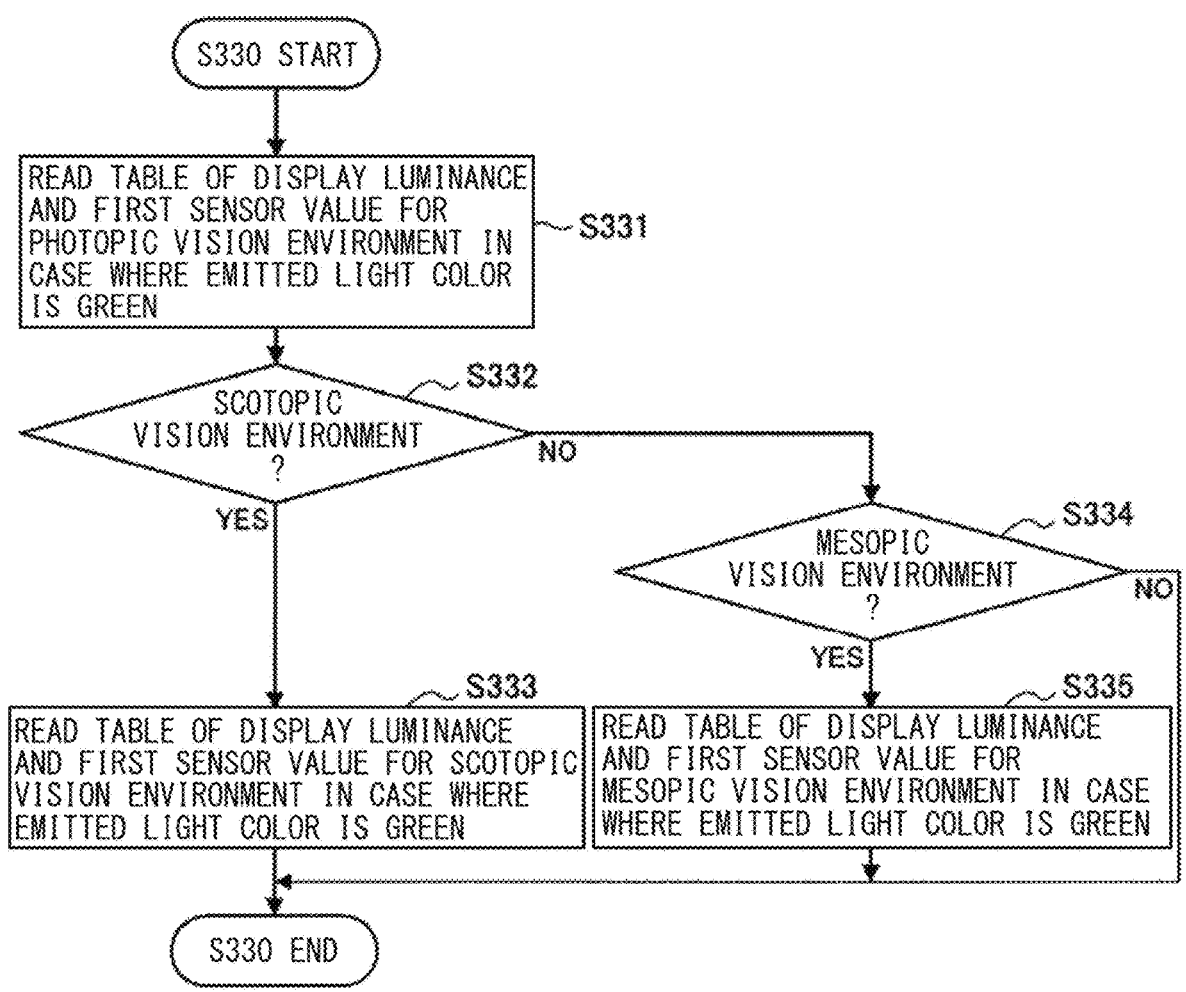
FIG. 24 is a flowchart illustrating an example of a detailed processing flow in step S330 in the flowchart illustrated in FIG. 21.

FIG. 24 is a flowchart illustrating an example of a flow of detailed processing in the step S330 in the flowchart illustrated in FIG. 21. As illustrated in FIG. 24, first, the table of display luminance and the first sensor value for the photopic vision environment in a case where the emitted light color is green is read (step S331). Next, the CPU 31 determines whether or not the environment is the scotopic vision environment on the basis of the second sensor value (step S332). In a case where it is determined that the environment is the scotopic vision (step S332/YES), the CPU 31 reads (rereads) the table of display luminance and the first sensor value for the scotopic vision environment in a case where the emitted light color is green (S333). Thereafter, the processing ends. In a case where it is determined that the environment is not the scotopic vision environment (the step S332/NO), the CPU 31 determines whether or not the environment is the mesopic vision environment on the basis of the second sensor value (step S334). In a case where it is determined that the environment is the mesopic vision environment (the step S334/YES), the CPU 31 reads (that is, rereads) the table of display luminance and the first sensor value for the mesopic vision environment in a case where the emitted light color is green (S335). Thereafter, the processing ends. In a case where it is determined that the environment is not the mesopic vision environment (the step S334/NO), the processing ends.

6. Conclusion

The embodiments of the present disclosure have been described in detail with reference to FIGS. 1 to 24. As described above, the transmissive HMD 1 according to the present embodiment controls the light output of the light source on the basis of the wavelength of light outputted from the light source and the diffraction efficiency of the combiner 10 that is changed resulting from change in the wavelength of incident light. Specifically, the transmissive HMD 1 controls a current value to be supplied to the LED 21 on the basis of the emission light wavelength of the LED 21 that is changed upon the current value control, and the diffraction efficiency of the combiner 10 that differs depending on wavelength. This makes it possible for the transmissive HMD 1 to achieve accurate luminance control in consideration of the light emission wavelength that is changed resulting from the current value control, and change that is given to display luminance by change in the light emission wavelength and characteristics of the diffraction efficiency of the combiner 10.

In addition, the transmissive HMD 1 according to the present embodiment dynamically changes the light modulation system from the PWM control to the current value control while maintaining gray scales. Thus, using not only a decrease in the LED luminance but also a decrease in the diffraction efficiency of the combiner 10 makes it possible to further decrease the display luminance.

In addition, the transmissive HMD 1 according to the present embodiment performs feedback control and/or control corresponding to intensity of ambient light. It is possible to more accurately achieve desired luminance by the feedback control. It is possible to accurately achieve desired luminance in any visual environment by the control corresponding to the intensity of the ambient light. For example, it is possible to use the transmission HMD 1 under a wide range of ambient light conditions from high luminance display in a bright environment such as outdoor to low luminance display at a dark place such as a movie theater, for example.

Although some preferred embodiments of the present disclosure have been described in detail above with reference to the accompanying drawings, the technical scope of the present disclosure should not be limited to such examples. It is clear that those having ordinary knowledge in the art in the technical field of the present disclosure will easily arrive at various alterations or modifications within a scope of the technical idea described in the claims, and it is understood that these alternations or modifications naturally belong to the technical scope of the present disclosure.

For example, in the above-described embodiments, the HMD has been described as an example of the optical see-through display apparatus, but the present technology is not limited thereto. For example, the optical see-through display apparatus may be a head-up display. In addition, the optical see-through display apparatus may be a contact lens type apparatus that displays an image on a contact lens.

For example, in the above-described embodiments, the LED has been described as an example of the light source, but the present technology is not limited thereto. For example, the light source may be a laser light source. A wavelength of laser light emitted from the laser light source is shifted in accordance with change in temperature. Accordingly, the transmissive HMD 1 controls an light output of the laser light source on the basis of a wavelength shift associated with change in temperature.

It is to be noted that the series of processes by each device described in the present specification may be achieved by using any of software, hardware, and the combination of software and hardware. A program included in the software is stored in advance, for example, in a recording medium (for example, a non-transitory medium) provided inside or outside each device. Then, each program is read by a RAM, for example, when executed by a computer, and is executed by a processor such as a CPU. Examples of the above-described recording medium include magnetic disks, optical disks, magneto-optical disks, flash memories, and the like. In addition, the above-described computer program may be distributed through a network, for example, without using the recording medium.

In addition, the processing described by using the flowcharts in the present specification may not be necessarily executed in the illustrated order. Some of processing steps may be executed in parallel. In addition, an additional processing step may be adopted, and some of the processing steps may be omitted.

In addition, the effects described in the present specification are merely illustrative or exemplary, and are not limitative. That is, the technology according to the present disclosure may achieve, in addition to or in place of the above effects, other effects that are obvious to those skilled in the art from the description of the present specification.

It is to be noted that the following configurations also belong to the technical scope of the present disclosure.

(1)

A display apparatus including an optical see-through display apparatus, the display apparatus including:
  a light source that emits light;
  a combiner including a diffraction member that diffracts light incident from the light source and outputs the light; and
  a controller that controls light emission of the light source, the controller controlling a light output of the light source on the basis of a wavelength of light outputted from the light source and diffraction efficiency of the combiner that is changed resulting from change in a wavelength of incident light.

(2)

The display apparatus according to (1), in which the controller controls the light output of the light source to cause display luminance of the light outputted from the combiner to become a target value.

(3)

The display apparatus according to (2), in which the controller performs PWM control in a case where the target value is equal to or greater than a first threshold value, and performs current value control in a case where the target value is less than the first threshold value.

(4)

The display apparatus according to (3), in which the first threshold value is a lower limit value of display luminance that is achievable by the PWM control.

(5)

The display apparatus according to (3) or (4), further including a first optical sensor that detects a first sensor value indicating intensity of the light outputted from the combiner, in which the controller controls the light output of the light source on the basis of the target value and the first sensor value.

(6)

The display apparatus according to (5), in which in a case where the target value is less than the first threshold value, the controller determines a current value to be supplied to the light source to cause display luminance corresponding to the first sensor value and the target value to coincide with each other.

(7)

The display apparatus according to (5) or (6), further including a second optical sensor that detects a second sensor value indicating intensity of ambient light, in which the controller controls the light output of the light source on the basis of the second sensor value.

(8)

The display apparatus according to (7), in which in a case where the target value is equal to or greater than the first threshold value, the controller uses a current value corresponding to the second sensor value in the PWM control.

(9)

The display apparatus according to (7) or (8), in which in a case where the target value is less than the first threshold value, the controller determines a current value to be supplied to the light source to cause display luminance corresponding to the first sensor value and the second sensor value, and the target value to coincide with each other.

(10)

The display apparatus according to any one of (7) to (9), in which the light source emits at least one of light of a first color or light of a second color, and the controller controls an emitted light color of the light source in accordance with the target value.

(11)

The display apparatus according to (10), in which the controller causes the light of the first color to be emitted in a case where the target value is equal to or greater than the second threshold value, causes both the light of the first color and the light of the second color to be emitted in a case where the target value is equal to or greater than a third threshold value and less than the second threshold value, and causes the light of the second color to be emitted in a case where the target value is less than the third threshold value.

(12)

The display apparatus according to (10) or (11), in which the controller controls the emitted light color of the light source in accordance with the second sensor value.

(13)

The display apparatus according to any one of (10) to (12), in which the first color includes green and the second color includes amber.

(14)

The display apparatus according to any one of (1) to (13), further including a display element that generates image light with use of the light incident from the light source and outputs the image light.

(15)

The display apparatus according to any one of (1) to (14), in which the light source includes an LED.

(16)

A display control method including a display control method of an optical see-through display apparatus, the optical see-through display apparatus including a light source that emits light and a combiner including a diffraction member that diffracts light incident from the light source and outputs the light, the display control method including:
controlling a light output of the light source on the basis of a wavelength of light outputted from the light source and diffraction efficiency of the combiner that is changed resulting from change in a wavelength of incident light.

(17)

A recording medium storing a program causing a computer that controls an optical see-through display apparatus to function as a controller,
the optical see-through display apparatus including a light source that emits light and a combiner including a diffraction member that diffracts light incident from the light source and outputs the light, and
the controller that controls a light output of the light source on the basis of a wavelength of light outputted from the light source and diffraction efficiency of the combiner that is changed resulting from change in a wavelength of incident light.

REFERENCE SIGNS LIST

1: HMD
10: combiner
11: hologram
12: transparent plate
20: optical engine
21: light source, LED
22: display element, MEMS mirror
23: lens
30: display control device
31: CPU
32: LED current driver
40: first optical sensor
41: second optical sensor

The invention claimed is:

1. A display apparatus including an optical see-through display apparatus, the display apparatus comprising:
a light source configured to emit light;
a combiner including a diffraction member, wherein the diffraction member is configured to:
diffract light incident from the light source, and
output the diffracted light; and
a controller configured to control the light emission of the light source, wherein
the light emitted by the light source is controlled based on a wavelength of the light emitted by the light source and diffraction efficiency, of the combiner, that is changed resulting from change in a wavelength of the light incident from the light source.

2. The display apparatus according to claim 1, wherein the controller is further configured to control the emission of the light by the light source to cause display luminance of the light outputted from the combiner to become a target value.

3. The display apparatus according to claim 2, wherein the controller is configured to:
perform PWM (Pulse Width Modulation) control in a case where the target value is equal to or greater than a first threshold value; and
perform current value control of the light source in a case where the target value is less than the first threshold value.

4. The display apparatus according to claim 3, wherein the first threshold value is a lower limit value of the display luminance that is achievable by the PWM control.

5. The display apparatus according to claim 3, further comprising a first optical sensor configured to detect a first sensor value indicating intensity of the light outputted from the combiner, wherein
the controller is further configured to control the emission of the light by the light source based on the target value and the first sensor value.

6. The display apparatus according to claim 5, wherein in a case where the target value is less than the first threshold value, the controller is further configured to determine a current value to be supplied to the light source to cause the display luminance corresponding to the first sensor value and the target value to coincide with each other.

7. The display apparatus according to claim 5, further comprising a second optical sensor configured to detect a second sensor value indicating intensity of ambient light, wherein the controller is further configured to control the emission of the light by the light source based on the second sensor value.

8. The display apparatus according to claim 7, wherein in a case where the target value is equal to or greater than the first threshold value, the controller is further configured to use a current value corresponding to the second sensor value in the PWM control.

9. The display apparatus according to claim 7, wherein in a case where the target value is less than the first threshold value, the controller is further configured to determine a current value to be supplied to the light source to cause the display luminance corresponding to the first sensor value and the second sensor value, and the target value to coincide with each other.

10. The display apparatus according to claim 7, wherein the light source is further configured to emit at least one of light of a first color or light of a second color, and the controller is further configured to control an emitted light color of the light source based on the target value.

11. The display apparatus according to claim 10, wherein the controller is further configured to:
cause the light of the first color to be emitted in a case where the target value is equal to or greater than a second threshold value,
cause both the light of the first color and the light of the second color to be emitted in a case where the target value is equal to or greater than a third threshold value and less than the second threshold value, and
cause the light of the second color to be emitted in a case where the target value is less than the third threshold value.

12. The display apparatus according to claim 10, wherein the controller is further configured to control the emitted light color of the light source based on the second sensor value.

13. The display apparatus according to claim 10, wherein the first color includes green and the second color includes amber.

14. The display apparatus according to claim 1, further comprising a display element configured to:
generate image light with use of the light incident from the light source; and
output the image light.

15. The display apparatus according to claim 1, wherein the light source includes an LED.

16. A display control method of an optical see-through display apparatus, comprising:
the optical see-through display apparatus including a light source that emits light and a combiner including a diffraction member that diffracts light incident from the light source and outputs the diffracted light,
controlling the light emission of the light source based on a wavelength of the light emitted by the light source and diffraction efficiency, of the combiner, that is changed resulting from change in a wavelength of the light incident from the light source.

17. A non-transitory computer-readable medium having stored thereon, computer-executable instructions which, when executed by a computer that controls an optical see-through display apparatus to function as a controller, cause the computer to execute operations, the operations comprising:
the optical see-through display apparatus including a light source that emits light and a combiner including a diffraction member that diffracts light incident from the light source and outputs the diffracted light,
controlling the light emission of the light source based on a wavelength of the light emitted by the light source and diffraction efficiency, of the combiner, that is changed resulting from change in a wavelength of the light incident from the light source.

* * * * *